United States Patent
Li

(10) Patent No.: US 11,968,706 B2
(45) Date of Patent: Apr. 23, 2024

(54) UPLINK DATA TRANSMISSION METHOD AND APPARATUS, DEVICE, AND SYSTEM

(71) Applicant: BEIJING XIAOMI MOBILE SOFTWARE CO., LTD., Beijing (CN)

(72) Inventor: Yuanyuan Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 439 days.

(21) Appl. No.: 17/277,289

(22) PCT Filed: Sep. 21, 2018

(86) PCT No.: PCT/CN2018/107119
§ 371 (c)(1),
(2) Date: Mar. 17, 2021

(87) PCT Pub. No.: WO2020/056773
PCT Pub. Date: Mar. 26, 2020

(65) Prior Publication Data
US 2021/0360651 A1    Nov. 18, 2021

(51) Int. Cl.
*H04W 72/566* (2023.01)
*H04W 72/1268* (2023.01)
*H04W 72/23* (2023.01)

(52) U.S. Cl.
CPC ..... *H04W 72/569* (2023.01); *H04W 72/1268* (2013.01); *H04W 72/23* (2023.01)

(58) Field of Classification Search
None
See application file for complete search history.

(56) References Cited

U.S. PATENT DOCUMENTS 8,301,951 B2   10/2012  Miki
11,172,471 B2*  11/2021  Yu .................. H04W 72/21
(Continued)

FOREIGN PATENT DOCUMENTS

CN    101938701 A    1/2011
CN    102523121 A    6/2012
(Continued)

OTHER PUBLICATIONS

VIVO. "Discussion on handling UL multiplexing of transmissions with different reliability requirements",3GPP TSG RAN WG1 Meeting #92bis, R1-1803848, Apr. 20, 2018 (Apr. 20, 2018), sections 1 and 2.

(Continued)

*Primary Examiner* — Clemence S Han
(74) *Attorney, Agent, or Firm* — Syncoda LLC; Feng Ma

(57) ABSTRACT

An uplink data transmission method includes: a first terminal transmits the uplink data of a first service type over a first uplink resource; the first terminal receives a scheduling indication transmitted by a network device, wherein the scheduling indication comprises the starting position and the scheduling period of semi-persistent scheduling; before the starting position, the first terminal stops transmitting the uplink data of the first service type; after the starting position, the first terminal transmits the uplink data of the first service type again according to the scheduling period. The first terminal determines the starting position of scheduling and the scheduling period according to the scheduling indication, and stops transmitting and performs transmission again according to the starting position.

18 Claims, 8 Drawing Sheets

(56) References Cited

U.S. PATENT DOCUMENTS

| | | | |
|---|---|---|---|
| 2018/0035332 A1* | 2/2018 | Agiwal | H04W 28/16 |
| 2018/0262311 A1 | 9/2018 | Wang et al. | |
| 2019/0254081 A1* | 8/2019 | Li | H04W 74/0841 |
| 2019/0268938 A1* | 8/2019 | Zhao | H04L 5/0055 |
| 2019/0280802 A1* | 9/2019 | Ma | H04L 1/008 |
| 2019/0394758 A1* | 12/2019 | Cheng | H04W 24/08 |
| 2020/0022160 A1* | 1/2020 | Zou | H04W 72/21 |
| 2020/0037314 A1* | 1/2020 | Xiong | H04L 1/1812 |
| 2021/0258049 A1* | 8/2021 | Esswie | H04W 72/1263 |
| 2021/0314981 A1* | 10/2021 | Liang | H04W 72/23 |
| 2021/0329623 A1* | 10/2021 | Yoshioka | H04L 1/0003 |

FOREIGN PATENT DOCUMENTS

| | | |
|---|---|---|
| CN | 106856630 A | 6/2017 |
| CN | 107371260 A | 11/2017 |
| CN | 107623951 A | 1/2018 |
| CN | 108270539 A | 7/2018 |
| CN | 108306706 A | 7/2018 |
| CN | 108391467 A | 8/2018 |
| CN | 108513735 A | 9/2018 |
| CN | 108521674 A | 9/2018 |
| CN | 108738135 A | 11/2018 |
| EP | 3834559 A1 | 6/2021 |
| WO | 2018021834 A1 | 2/2018 |
| WO | 2018120120 A1 | 7/2018 |
| WO | 2018129325 A1 | 7/2018 |

OTHER PUBLICATIONS

VIVO. "Discussion on UL handling multiplexing of eMBB and URLLC",3GPP TSG RAN WG1 Meeting #88 R1-1703393, Feb. 17, 2017 (Feb. 17, 2017).

International Search Report in the international application No. PCT/CN2018/107119, dated May 29, 2019.

Written Opinion of the International Search Authority in the international application No. PCT/CN2018/107119, dated May 29, 2019.

First Office Action of the Chinese application No. 201880001449.6, dated Jun. 23, 2021.

Office Action of the Indian application No. 202147017627, dated Feb. 24, 2022.

Zte: "Consideration on SPS and grant-free", 3GPP Draft; R2-1710322 Consideration on SPS and Grantfree, 3rd Generation Partnership Project (3GPP), Mobile Competence Centre ; 650, Route Des Lucioles; F-06921 Sophia-Antipolis Cedex; France, vol. RAN WG2, No. Prague, Czech Republic; Oct. 9, 2017-Oct. 13, 2017 Oct. 8, 2017 (Oct. 8, 2017), XP051342370, Retrieved from the Internet: URL:http://www.3gpp.org/ftp/Meetings_3GPP_SYNC/RAN2/Docs/ [retrieved on Oct. 8, 2017], * section 2.2 *.

Panasonic: "Relation between UL grant-free and SPS", 3GPP Draft; R1-1708116, 3rd Generation Partnership Project (3GPP), Mobile Competence Centre ; 650, Route Deslucioles ; F-06921 Sophia-Antipolis Cedex; France, No. Hangzhou; May 15, 2017-May 19, 2017 May 14, 2017 (May 14, 2017), XP051273312, Retrieved from the Internet: URL:http://www.3gpp.org/ftp/Meetings_3GPP_SYNC/RAN1/Docs/ [retrieved on May 14, 2017], * section 1 *.

Supplementary European Search Report in the European application No. 18934087.0, dated Apr. 8, 2022.

Notice of Allowance of the Chinese application No. 201880001449.6, dated Jan. 6, 2022.

* cited by examiner

UPLINK DATA TRANSMISSION METHOD AND APPARATUS, DEVICE, AND SYSTEM

CROSS-REFERENCE TO RELATED APPLICATION

This application is a U.S. national stage of International Application No. PCT/CN2018/107119 filed on Sep. 21, 2018, the disclosure of which is hereby incorporated by reference in its entirety.

TECHNICAL FIELD

The present disclosure relates to the field of communications, and more particularly, to a method and an apparatus for uplink data transmission, a device, and a system.

BACKGROUND

Three scenarios of $5^{th}$ generation mobile network (5G) are defined at the third generation partnership project (3GPP) meeting: enhanced mobile broad band (eMBB), massive machine type of communication (mMTC), and ultra-reliable & low latency communication (uRLLC).

Since a terminal supporting an uRLLC service has a high requirement for transmission delay and an uRLLC terminal may initiate its own service transmission at any time according to its own requirements, if a current physical transmission resource also carries an eMBB service in addition to the uRLLC service, transmission of the uRLLC service may conflict with transmission of the eMBB service. On one hand, the reliability of the uRLLC service is affected, and on the other hand, the transmission of the eMBB service is also affected.

SUMMARY

In order to solve the problem that a transmission conflict occurs between an uRLLC service and an eMBB service due to the uRLLC service and the eMBB service are multiplexed to a same uplink resource for transmission, embodiments of the present disclosure provide a technical solution, specifically as follows.

According to an aspect of the embodiments of the present disclosure, a method for uplink data transmission is provided, which includes that:
  a first terminal transmits uplink data of a first service type on a first uplink resource;
  the first terminal receives a scheduling indication from an access network device, where the scheduling indication includes a starting position and a scheduling period of semi-persistent scheduling;
  the first terminal suspends transmission of the uplink data of the first service type before the starting position; and
  the first terminal continues the transmission of the uplink data of the first service type according to the scheduling period after the starting position.

The scheduling indication is sent by the access network device after detecting that a second terminal transmits uplink data of a second service type on the first uplink resource, and a priority of the second service type is higher than a priority of the first service type.

In some possible implementations, the starting position may be a sub-frame in which the scheduling indication is located; or, the starting position may be a sub-frame in which the first uplink resource is located.

In some possible implementations, the scheduling period may include n scheduling periods of different durations, n being an integer greater than 1.

The first terminal may determine a second uplink resource according to the starting position and a target scheduling period, and the target scheduling period is one of the n scheduling periods; and
  the first terminal may continue the transmission of the uplink data of the first service type on the second uplink resource.

In some possible implementations, the target scheduling period may be a minimum scheduling period among the n scheduling periods in an initial state.

The first terminal may determine a third uplink resource for next transmission according to the target scheduling period and the second uplink resource when receiving an acknowledgement feedback from the access network device; and
  the first terminal may continue the transmission of the uplink data of the first service type on the third uplink resource.

When the first terminal does not receive an acknowledgement feedback from the access network device, the first terminal may adjust the target scheduling period from an $i^{th}$ scheduling period to an $(i+1)^{th}$ scheduling period among the n scheduling periods, and determine a third uplink resource for next transmission according to the adjusted target scheduling period and the second uplink resource; where $0 \leq i \leq n-1$.

The first terminal may stop the transmission of the uplink data of the first service type when the first terminal does not receive the acknowledgement feedback from the access network device and a number of times for which the target scheduling period is adjusted reaches a threshold.

Alternatively, the first terminal may stop the transmission of the uplink data of the first service type when the first terminal does not receive the acknowledgement feedback from the access network device and the target scheduling period is a maximum scheduling period among the n scheduling periods.

In some possible implementations, the target scheduling period may be a maximum scheduling period among the n scheduling periods in an initial state.

When the first terminal receives an acknowledgement feedback from the access network device and the target scheduling period is not a minimum scheduling period among the n scheduling periods, the first terminal may adjust the target scheduling period from an $i^{th}$ scheduling period to an $(i-1)^{th}$ scheduling period among the n scheduling periods, and determine a third uplink resource for next transmission according to the target scheduling period and the second uplink resource; where $0 \leq i \leq n-1$; and
  the first terminal may continue the transmission of the uplink data of the first service type on the third uplink resource.

When the first terminal does not receive the acknowledgement feedback from the access network device, the first terminal may recover the target scheduling period from the $(i-1)^{th}$ scheduling period to the $i^{th}$ scheduling period among the n scheduling periods, and determine a fourth uplink resource for next transmission according to the target scheduling period and the third uplink resource; and
  the first terminal may continue the transmission of the uplink data of the first service type on the fourth uplink resource.

The first terminal may stop the transmission of the uplink data of the first service type when the first terminal does not receive an acknowledgement feedback from the access network device.

In some possible implementations, the first terminal may receive a resource release indication from the access network device.

The first terminal may stop, according to the resource release indication, the transmission of the uplink data of the first service type on an uplink resource scheduled through the semi-persistent scheduling.

According to another aspect of the embodiments of the present disclosure, a method for uplink data transmission is provided, which includes that:

an access network device receives uplink data on a first uplink resource; and the access network device transmits a scheduling indication to a first terminal when detecting that uplink data of a first service type sent by a first terminal and uplink data of a second service type sent by a second terminal simultaneously exist on the first uplink resource, where the scheduling indication includes a starting position and a scheduling period of semi-persistent scheduling, and a priority of the second service type is higher than a priority of the first service type.

In some possible implementations, the access network device may transmit a resource release indication to the first terminal when detecting that transmission of the uplink data of the second service type by the second terminal has completed, and the resource release indication is used for instructing the first terminal to stop transmission of the uplink data of the first service type on an uplink resource scheduled through the semi-persistent scheduling.

According to yet another aspect of the embodiments of the present disclosure, an apparatus for uplink data transmission is provided. The apparatus includes a first transmitting module, a first receiving module, and a processing module.

The first transmitting module is configured to transmit uplink data of a first service type on a first uplink resource.

The first receiving module is configured to receive a scheduling indication from an access network device, where the scheduling indication includes a starting position and a scheduling period of semi-persistent scheduling.

The processing module is configured to suspend transmission of the uplink data of the first service type before the starting position.

The first transmitting module is further configured to continue the transmission of the uplink data of the first service type according to the scheduling period after the starting position.

The scheduling indication is sent by the access network device after detecting that a second terminal transmits uplink data of a second service type on the first uplink resource, and a priority of the second service type is higher than a priority of the first service type.

In some possible implementations, the starting position may be a sub-frame in which the scheduling indication is located; or the starting position may be a sub-frame in which the first uplink resource is located.

In some possible implementations, the scheduling period may include n scheduling periods of different durations, n being an integer greater than 1.

The processing module is further configured to determine a second uplink resource according to the starting position and a target scheduling period, and the target scheduling period is one of the n scheduling periods; and the first transmitting module is further configured to continue the transmission of the uplink data of the first service type on the second uplink resource.

In some possible implementations, the target scheduling period may be a minimum scheduling period among the n scheduling periods in an initial state.

The processing module is further configured to determine a third uplink resource for next transmission according to the target scheduling period and the second uplink resource when receiving an acknowledgement feedback from the access network device; and the first transmitting module is further configured to continue the transmission of the uplink data of the first service type on the third uplink resource.

When the first terminal does not receive an acknowledgement feedback from the access network device, the processing module is further configured to adjust the target scheduling period from an $i^{th}$ scheduling period to an $(i+1)^{th}$ scheduling period among the n scheduling periods, and determine a third uplink resource for next transmission according to the adjusted target scheduling period and the second uplink resource; where $0 \le i \le n-1$.

The processing module is further configured to stop the transmission of the uplink data of the first service type when the first terminal does not receive the acknowledgement feedback from the access network device and a number of times for which the target scheduling period is adjusted reaches a threshold.

Alternatively, the processing module is further configured to stop the transmission of the uplink data of the first service type when the first terminal does not receive the acknowledgement feedback from the access network device and the target scheduling period is a maximum scheduling period among the n scheduling periods.

In some possible implementations, the target scheduling period may be a maximum scheduling period among the n scheduling periods in an initial state.

The processing module is further configured to, when the first terminal receives an acknowledgement feedback from the access network device and the target scheduling period is not a minimum scheduling period among the n scheduling periods, adjust the target scheduling period from an $i^{th}$ scheduling period to an $(i-1)^{th}$ scheduling period among the n scheduling periods, and determine a third uplink resource for next transmission according to the target scheduling period and the second uplink resource; where $0 \le i \le n-1$; and the first transmitting module is further configured to continue the transmission of the uplink data of the first service type on the third uplink resource.

The processing module is further configured to, when the first terminal does not receive the acknowledgement feedback from the access network device, recover the target scheduling period from the $(i-1)^{th}$ scheduling period to the $i^{th}$ scheduling period among the n scheduling periods, and determine a fourth uplink resource for next transmission according to the target scheduling period and the third uplink resource; and the first transmitting module is further configured to continue the transmission of the uplink data of the first service type on the fourth uplink resource.

The processing module is further configured to stop the transmission of the uplink data of the first service type when the first terminal does not receive an acknowledgement feedback from the access network device.

In some possible implementations, the first receiving module may be further configured to receive a resource release indication from the access network device; and the processing module is further configured to stop, according to the resource release indication, the transmission of the uplink data of the first service type on an uplink resource scheduled through the semi-persistent scheduling.

According to still another aspect of the embodiments of the present disclosure, an apparatus for uplink data transmission is provided. The apparatus for uplink data transmission includes a second receiving module and a second transmitting module.

The second receiving module is configured to receive uplink data on a first uplink resource.

The second transmitting module is configured to transmit a scheduling indication to a first terminal when detecting that uplink data of a first service type sent by a first terminal and uplink data of a second service type sent by a second terminal simultaneously exist on the first uplink resource, and the scheduling indication includes a starting position and a scheduling period of semi-persistent scheduling.

The priority of the second service type is higher than a priority of the first service type.

In some possible implementations, the second transmitting module may be further configured to transmit a resource release indication to the first terminal when detecting that transmission of the uplink data of the second service type by the second terminal has completed, where the resource release indication is used for instructing the first terminal to stop transmission of the uplink data of the first service type on an uplink resource scheduled through the semi-persistent scheduling.

According to yet still another aspect of the embodiments of the present disclosure, a terminal is provided, which includes that: a processor; a transceiver connected to the processor; and a memory for storing instructions executable by the processor. The processor is configured to perform the method for the uplink data transmission as described above.

According to yet still another aspect of the embodiments of the present disclosure, an access network device is provided, which includes that: a processor; a transceiver connected to the processor; and a memory for storing instructions executable by the processor. The processor is configured to perform the method for the uplink data transmission as described above.

According to yet still another aspect of the embodiments of the present disclosure, a communication system is provided, which includes that: a first terminal and an access network device. The first terminal includes the apparatus for the uplink data transmission as described above. The access network device includes the apparatus for the uplink data transmission as described above.

According to yet still another aspect of the embodiments of the present disclosure, a communication system is provided, which includes that: a first terminal and an access network device. The first terminal includes the terminal as described above. The access network device includes the access network device as described above.

According to yet still another aspect of the embodiments of the present disclosure, a chip is provided, which includes that at least one of: programmable logic circuits, or program instructions. The chip, when running, performs the method for the uplink data transmission as described above.

According to yet still another aspect of the embodiments of the present disclosure, a computer storage medium is provided, which includes that at least one of: programmable logic circuits or program instructions. The computer storage medium, when executed, performs the method for the uplink data transmission as described above.

According to yet still another aspect of the embodiments of the present disclosure, a computer program product is provided, which includes that at least one of: programmable logic circuits or program instructions. When the computer program product is running, the method for the uplink data transmission as described above is performed.

The technical solution in the embodiments of the present disclosure may provide the following beneficial effects.

The first terminal determines a scheduling starting position and a scheduling period according to a scheduling instruction. The first terminal suspends and continues transmission of the uplink data according to the scheduling starting position and the scheduling period, so that transmission of the uplink data of a first service type (such as a eMBB service) can stagger transmission of the uplink data of a second service type (such as a uRLLC service), thereby avoiding a problem of transmission conflict between the first type of service and the second type of service, and enabling a first type of service with a low priority to transmit after transmission of the second type of service with a high priority is completed, thereby ensuring a transmission delay requirement of the second type of service with a high priority.

BRIEF DESCRIPTION OF THE DRAWINGS

In order to more clearly describe the technical solutions in the embodiments of the present disclosure, the following will briefly introduce the drawings used in the description of the embodiments. It will be apparent that the accompanying drawings in the following description are merely some of the embodiments of the present disclosure, and other drawings may be made to those skilled in the art without involving any creative efforts.

DETAILED DESCRIPTION

In order to make the objectives, technical solutions, and advantages of the present disclosure clearer, the following will further describe the embodiments of the present disclosure in detail with reference to the accompanying drawings.

Three scenarios of 5G are defined at 3GPP conferences: eMBB, mMTC, and uRLLC. Among them, the eMBB refers to a large-traffic mobile broadband service such as 3D/ultra-high-definition video, the mMTC refers to a large-scale Internet of Things service, and the uRLLC refers to low-delay, high-reliable connection services such as unmanned driving and industrial automation. When the terminal transmits any one of the three services, the terminal first transmits a resource request to the access network device, the access network device allocates resource scheduling to the terminal, and then the terminal transmits data according to the resource scheduling.

Figure 1:
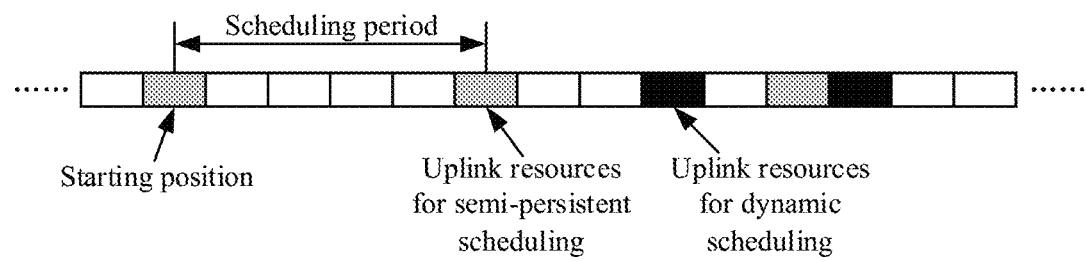
FIG. 1 is a schematic diagram of an uplink resource scheduling scheme according to an embodiment of the present disclosure.

There are two scheduling schemes in the 5G technology, i.e., a dynamic scheduling scheme and a semi-persistent scheduling scheme. As illustrated in FIG. 1, transmission of data on uplink resources using dynamic scheduling and semi-persistent scheduling is schematically illustrated. The dynamic scheduling scheme refers to that the terminal transmits a resource request, and the access network device allocates a resource in response to the resource request, and then the terminal transmits the resource request again for another scheduling resource. The dynamic scheduling in FIG. 1 does not have periodicity, but performs a dynamic resource request according to actual usage, and the access network device only allocates a resource scheduling to the terminal, that is, requests and allocates the resource scheduling at any time.

The semi-persistent scheduling refers to that after a terminal transmits a resource request, a corresponding resource is periodically allocated to the terminal within a period of time. In FIG. 1, for example, the scheduling period is 5 sub-frames, the terminal transmits a scheduling request (SR) to an access network device once, and a base station allocates uplink resources to the terminal and transmits a scheduling indication to the terminal. The scheduling indication includes a starting position and the scheduling period, i.e., 5 sub-frames. The starting position indicates a position at which the terminal can start to transmit data on the allocated uplink resources, and the scheduling period i.e., 5 sub-frames is used for instructing the terminal to transmit data once every five sub-frames. That is to say, the terminal starts to transmit data according to the position of every five sub-frames after the starting position, and does not need to transmit the resource request to the access network device after the transmission is started, that is, the semi-persistent scheduling has the characteristics of "one allocation, multiple use".

Some terminals supporting the eMBB service use the semi-persistent scheduling to transmit the eMBB data. The terminal transmits an SR, and the access network device transmits a scheduling indication to the terminal in response to receiving the SR. The scheduling indication carries scheduling period, i.e. n. The terminal periodically transmits uplink data to the access network device according to the scheduling period n. The scheduling period n indicates that the scheduling indication is to be applied every n sub-frames until the terminal receives further notification.

However, if there are two terminals, a first terminal for transmitting the eMBB service and a second terminal for transmitting the uRLLC service. When the first terminal transmits uplink data of the eMBB service, the second terminal randomly initiates transmission of uplink data of the uRLLC service according to a requirement. Since the two services multiplex the same uplink resource for transmission, a conflict may occur during transmission, and a transmission requirement of low delay of the uRLLC service cannot be ensured.

The embodiments of the present disclosure can solve the problem that when two terminals respectively transmit the eMBB service and the uRLLC service, and multiplex the same uplink resource, transmission conflict generated by the two terminals cannot ensure a transmission requirement of low delay of the uRLLC service.

Figure 2:
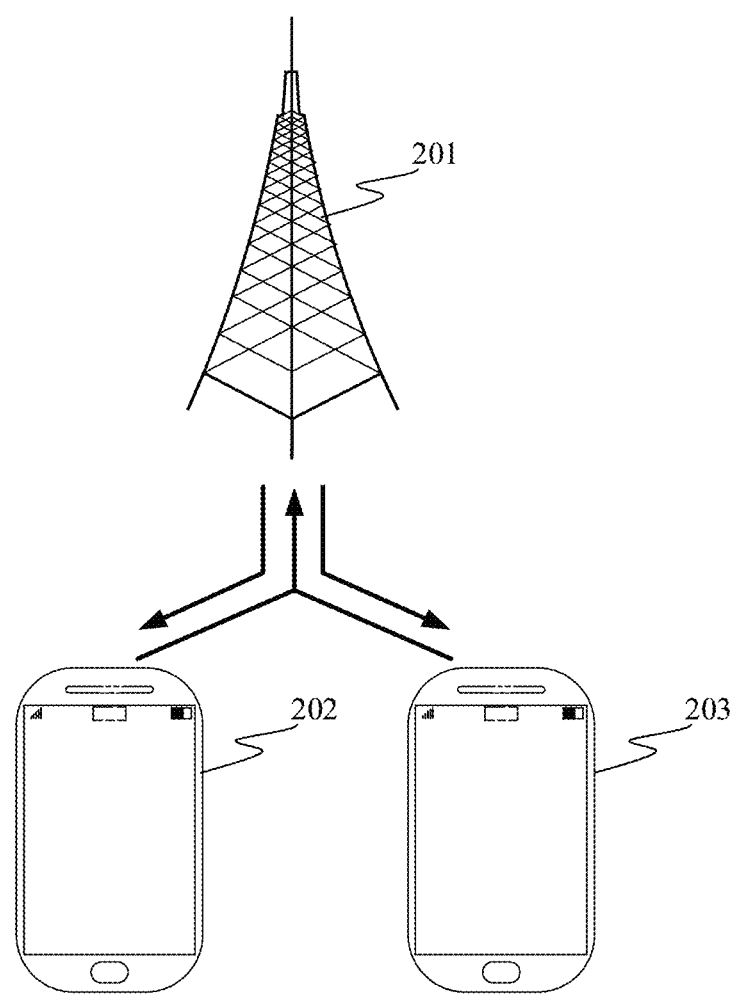
FIG. 2 is a schematic diagram of an implementation environment of a method for uplink data transmission according to an exemplary embodiment of the present disclosure.

FIG. 2 is a schematic diagram of an implementation environment of a method for uplink transmission according to an exemplary embodiment of the present disclosure. The implementation environment illustrated in FIG. 2 includes an access network device 201, a first terminal 202, and a second terminal 203.

The access network device 201 is configured to provide an access network service for the first terminal 202 and the second terminal 203. The access network device 201 may be a base station. The first terminal 202 is configured to transmit a first type of service, and the first type of service may be an eMBB service. The second terminal 203 is configured to transmit a second type of service, and the second type of service may be an uRLLC service. In an embodiment, when the first terminal 202 and the second terminal 203 perform service transmission, the same uplink resource may be multiplexed.

Since a priority of the second type of service is higher than a priority of the first type of service, in some embodiments of the present disclosure, the access network device 201 may, based on the priority of the first type of service and the priority of the second type of service, preferentially ensure that the second terminal 203 transmits uplink data, and may instruct the first terminal 202 to suspend transmission of the uplink data and retry to transmit the uplink data after a period of time.

In some embodiments of the present disclosure, the first terminal transmits the eMBB service, and the second terminal transmits the uRLLC service. When the first terminal and the second terminal multiplex the same uplink resource, the base station transmits a scheduling indication to the first terminal. The first terminal suspends transmission of the first terminal according to the scheduling indication, and determines a time-frequency resource for subsequent transmission according to a scheduling period, so as to avoid being affected by the eMBB service when the second terminal transmits the uRLLC service as much as possible.

Figure 3:
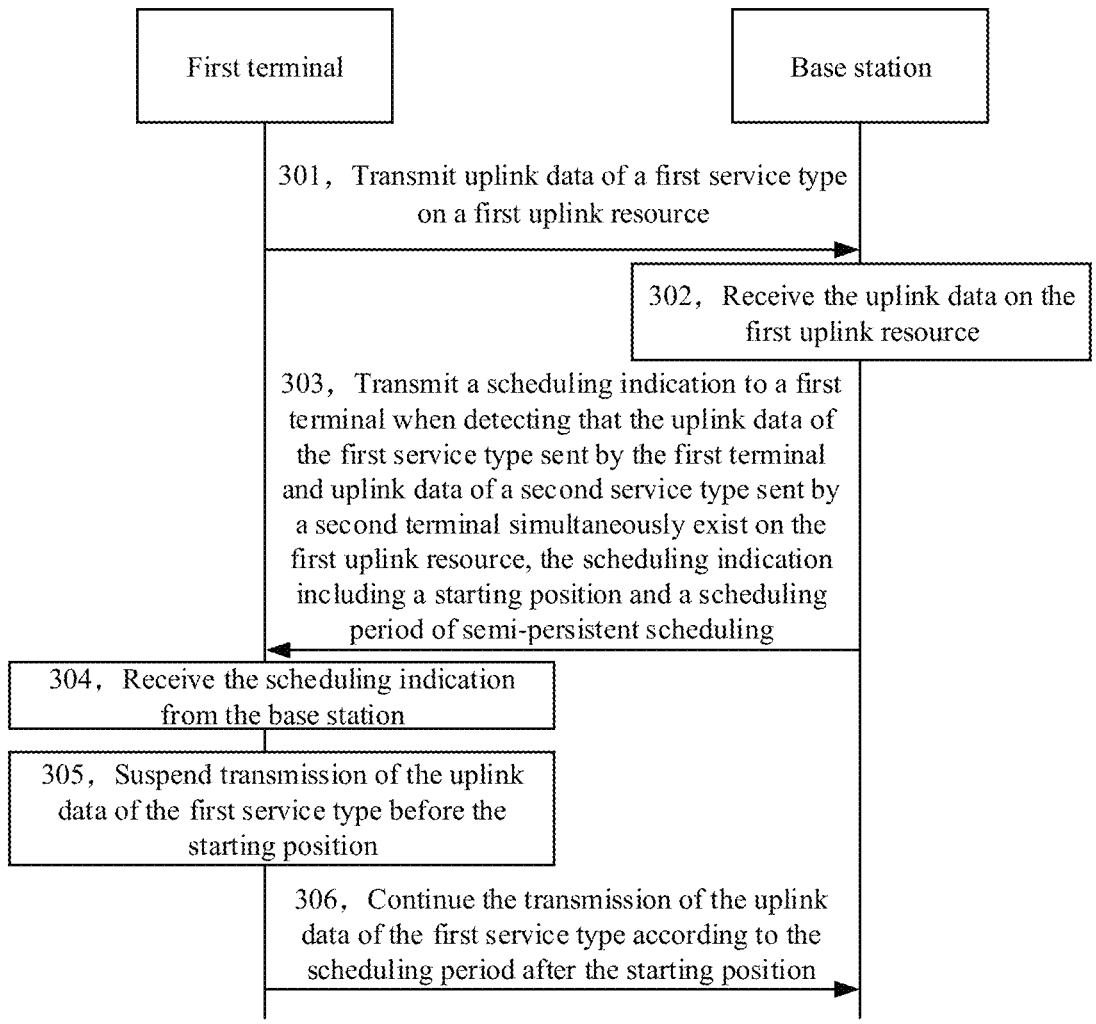
FIG. 3 is a flowchart of a method for uplink data transmission according to an exemplary embodiment of the present disclosure.

FIG. 3 is a flowchart of a method for uplink data transmission according to an exemplary embodiment of the present disclosure. The method can be applied to the implementation environment illustrated in FIG. 1. In this embodiment, for example, an access network device is a base station, a first terminal is configured to transmit a first type of service, and a second terminal is configured to transmit a second type of service. The priority of the second type of service is higher than a priority of the first type of service. The method includes the following operations.

In 301, a first terminal transmits uplink data of a first service type on a first uplink resource.

The first terminal transmits an SR to a base station for requesting uplink resources for transmission of the first type of service from the base station. The base station allocates a first uplink resource to the first terminal according to the SR sent by the first terminal, and the first terminal transmits uplink data of the first service type on the allocated first uplink resource. In an embodiment, the base station allocates the first uplink resource to the first terminal in dynamic scheduling or semi-persistent scheduling.

In an embodiment, because the priority of the uplink data of the second service type is higher, the second terminal initiates the transmission of the uplink data of the second service type at any time according to the requirement of the second terminal, and the first terminal and the second terminal may transmit their respective uplink data in a multiplexed form on the first uplink resource, thereby causing a conflict during transmission.

In 302, the base station receives uplink data on the first uplink resource.

In 303, the base station transmits a scheduling indication to a first terminal when detecting that uplink data of a first service type sent by a first terminal and uplink data of a second service type sent by a second terminal simultaneously exist on the first uplink resource. The scheduling indication includes a starting position and a scheduling period of semi-persistent scheduling.

The base station detects the first service type identifier and the second service type identifier when the base station simultaneously receives uplink data transmitted from the first terminal and uplink data transmitted from the second terminal on the first uplink resource. In an embodiment, the base station determines, according to the first service type identifier and the second service type identifier, that the priority of the second type of service is higher than the priority of the first type of service. For example, the priority of the uRLLC service is higher than the priority of the eMBB service.

The base station transmits a scheduling indication to the first terminal according to the first service type identifier to instruct the first terminal to stagger transmission of the second type of service on the next uplink resource. The scheduling indication includes a starting position and a scheduling period of the semi-persistent scheduling. The first terminal delays transmission of the uplink data of the first service type according to the scheduling indication.

The base station preferentially ensures transmission of data of the second service type according to the second service type identifier.

In 304, the first terminal receives a scheduling indication from the base station.

The first terminal receives a scheduling indication from the base station, and obtains a starting position and a scheduling period of the semi-persistent scheduling in the scheduling indication.

In an embodiment, the starting position is a sub-frame in which the scheduling indication is located; or the starting position is a sub-frame in which the first uplink resource is located.

In an embodiment, the scheduling period may be configured as one or more, and the number of scheduling periods and whether the scheduling periods are the same are not limited in this embodiment. In some embodiments, more than two scheduling periods are configured.

In 305, the first terminal suspends transmission of the uplink data of the first service type before the starting position.

In 306, the first terminal continues the transmission of the uplink data of the first service type according to the scheduling period after the starting position.

After the starting position, the first terminal further determines an uplink resource for next transmission according to the starting position and a scheduling period, and continues the transmission of the uplink data of the first service type on the uplink resource.

In summary, in the method provided in this embodiment, a first terminal determines a scheduling starting position and a scheduling period according to a scheduling indication, and the first terminal suspends and continues transmission of the uplink data according to the scheduling starting position and the scheduling period, so that transmission of the uplink data of a first service type (such as a eMBB service) can stagger transmission of the uplink data of a second service type (such as a uRLLC service), thereby avoiding a problem of transmission conflict between the first type of service and the second type of service, and enabling the first type of service with a low priority to transmit after transmission of the second type of service with a high priority is completed, thereby ensuring a transmission delay requirement of the second type of service with a high priority.

The above operations performed by the first terminal may be separately implemented as a method for uplink data transmission on the first terminal side; the above operations performed by the base station can be separately implemented as a method for uplink data transmission on the access network device side.

In some embodiments of the present disclosure, the scheduling indication sent by the base station to the first terminal includes a starting position and a scheduling period of the semi-persistent scheduling. The scheduling period includes n scheduling periods of different durations, n being an integer greater than 1, and the n scheduling periods of different durations may be arranged in ascending order. The target scheduling period is one of the n scheduling periods, and the target scheduling period is a minimum scheduling period (that is, a first scheduling period) among the n scheduling periods in an initial state.

Figure 4:
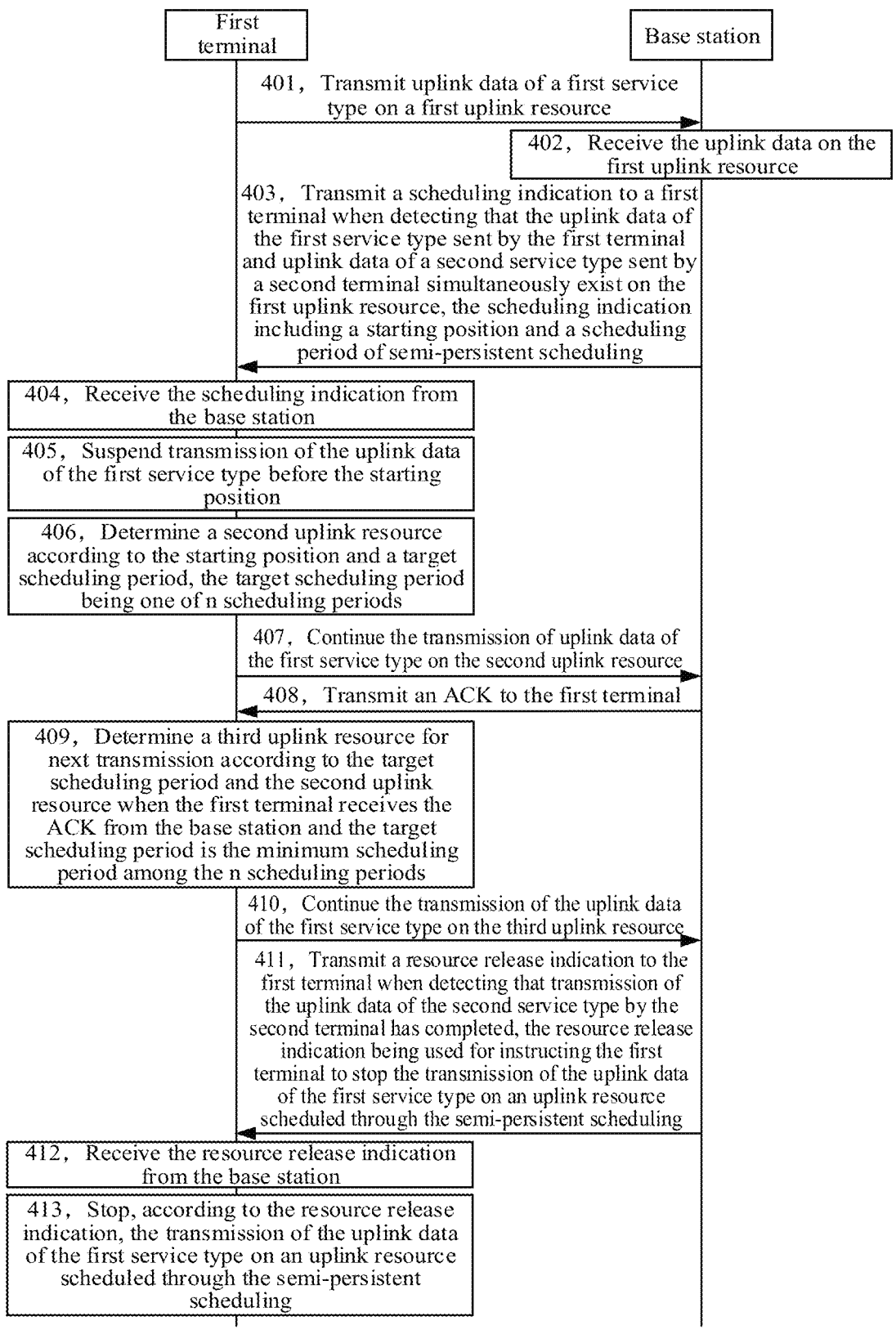
FIG. 4 is a flowchart of a method for uplink data transmission according to an exemplary embodiment of the present disclosure.

FIG. 4 is a flowchart of a method for uplink data transmission according to an exemplary embodiment of the present disclosure. The method can be applied to the implementation environment illustrated in FIG. 1. In this embodiment, for example, an access network device is a base station, a first terminal is configured for transmitting a first type of service, and a second terminal is configured for transmitting a second type of service. The priority of the second type of service is higher than a priority of the first type of service. The method includes the following operations.

In 401, a first terminal transmits uplink data of a first service type on a first uplink resource.

The first terminal transmits an SR to a base station for requesting uplink resources for transmission of the first type of service from the base station. The base station allocates a first uplink resource to the first terminal according to the SR sent by the first terminal, and the first terminal transmits uplink data of the first service type on the allocated first uplink resource. In an embodiment, the base station allocates the first uplink resource to the first terminal in dynamic scheduling or semi-persistent scheduling.

In an embodiment, because the priority of the uplink data of the second service type is higher, the second terminal initiates the transmission of the uplink data of the second service type at any time according to the requirement of the second terminal, and the first terminal and the second terminal may transmit their respective uplink data in a multiplexed form on the first uplink resource, thereby causing a conflict during transmission.

In 402, the base station receives uplink data on the first uplink resource.

In 403, the base station transmits a scheduling indication to a first terminal when detecting that uplink data of a first service type sent by a first terminal and uplink data of a second service type sent by a second terminal simultaneously exist on the first uplink resource. The scheduling indication includes a starting position and a scheduling period of semi-persistent scheduling.

The base station detects the first service type identifier and the second service type identifier when the base station simultaneously receives uplink data transmitted from the first terminal and uplink data transmitted from the second terminal on the first uplink resource. In an embodiment, the base station determines, according to the first service type identifier and the second service type identifier, that the priority of the second type of service is higher than the priority of the first type of service. For example, the priority of the uRLLC service is higher than the priority of the eMBB service.

The base station transmits a scheduling indication to the first terminal according to the first service type identifier to instruct the first terminal to stagger transmission of the second type of service on the next uplink resource. The scheduling indication includes a starting position and a scheduling period of the semi-persistent scheduling. The first terminal delays transmission of the uplink data of the first service type according to the scheduling indication.

In an embodiment, the base station preferentially ensures transmission of data of the second service type.

In 404, the first terminal receives a scheduling indication from the base station.

The first terminal receives a scheduling indication from the base station, and reads a starting position and a scheduling period of the semi-persistent scheduling in the scheduling indication.

In an embodiment, the starting position is a sub-frame in which the scheduling indication is located; or the starting position is a sub-frame in which the first uplink resource is located.

In an embodiment, the scheduling period may be configured as one or more, and the number of scheduling periods and whether the scheduling periods are the same are not limited in this embodiment. In some embodiments, more than two scheduling periods are configured, and the terminal may select according to a policy in two scheduling periods. For example, the scheduling periods includes n, 2n, and 4n.

In 405, the first terminal suspends transmission of the uplink data of the first service type before the starting position.

In 406, the first terminal may determine a second uplink resource according to the starting position and a target scheduling period. The target scheduling period is one of the n scheduling periods.

After the starting position, the first terminal determines the time-frequency position for transmitting the uplink data of the first service type again according to the starting position and the target scheduling period in the scheduling indication.

When two or more scheduling periods are configured, in the initial state, the terminal may determine that the target scheduling period is a minimum scheduling period among the n scheduling periods. In other words, the terminal defaults the minimum scheduling period among multiple scheduling periods as the scheduling period used in the current transmission.

The first terminal determines a second uplink resource for the next transmission of uplink data of the first service type according to the starting position and the target scheduling period.

In 407, the first terminal continues transmission of uplink data of the first service type on the second uplink resource.

In 408, the base station transmits an acknowledgement feedback to the first terminal.

When the base station receives uplink data transmitted from the first terminal and can successfully decode the uplink data, the base station transmits an acknowledgement feedback (ACK) to the first terminal.

In 409, when the first terminal receives the ACK from the base station and the target scheduling period is the minimum scheduling period among the n scheduling periods, the first terminal determines the third uplink resource for next transmission according to the target scheduling period and the second uplink resource.

The first terminal receives the ACK sent by the base station, and determines that the base station has received the uplink data and has decoded the uplink data.

When the target scheduling period in the initial state is the minimum scheduling period among the n scheduling periods, the first terminal keeps the target scheduling period unchanged, and continues to use the target scheduling period for next transmission, so that uplink data of the first service type can be received by the base station as soon as possible.

For example, the first terminal may determine the third uplink resource for the next transmission according to the target scheduling period and the second uplink resource.

In 410, the first terminal continues transmission of the uplink data of the first service type on the third uplink resource.

When the data amount of the uplink data of the first service type is large, operations 409 and 410 may be repeatedly performed.

In 411, the base station transmits a resource release indication to the first terminal when detecting that transmission of the uplink data of the second service type by the second terminal has completed, and the resource release indication is used for instructing the first terminal to stop transmission of the uplink data of the first service type on an uplink resource scheduled through the semi-persistent scheduling.

When transmission of the uplink data of the second service type by the second terminal has completed, the base station may transmit a resource release indication to the first terminal, and the resource release indication is used to instruct the first terminal to stop transmission of the uplink data of the first service type on an uplink resource scheduled through the semi-persistent scheduling.

In 412, the first terminal receives the resource release indication from the base station.

In 413, the first terminal, according to the resource release indication, stops the transmission of the uplink data of the first service type on an uplink resource scheduled through the semi-persistent scheduling.

In an embodiment, when transmission of the uplink data of the first service type has not completed, the base station may further allocate other time-frequency resources to the first terminal for transmission of the uplink data in a dynamic scheduling or other semi-persistent scheduling manners.

In summary, in the method provided in this embodiment, a first terminal determines a scheduling starting position and a scheduling period according to a scheduling indication. The first terminal suspends and continues transmission of the uplink data according to the scheduling starting position and the scheduling period, so that transmission of the uplink data of a first service type (such as a eMBB service) can stagger transmission of the uplink data of a second service type (such as a uRLLC service), thereby avoiding a problem of transmission conflict between the first type of service and the second type of service, and enabling the first type of service with a low priority to transmit after transmission of the second type of service with a high priority is completed, thereby ensuring a transmission delay requirement of the second type of service with a high priority.

In the method provided in the present embodiment, a first terminal determines a second uplink resource according to a starting position and a target scheduling period (i.e., a minimum scheduling period among multiple scheduling periods), and keeps the target scheduling period unchanged when receiving an ACK, and then determines an uplink resource for subsequent transmission according to the target scheduling period, thereby ensuring that uplink data of a first service type can be transmitted to a base station as soon as possible.

In the method provided in this embodiment, after detecting that transmission of the uplink data of the second service type by the second terminal has completed, the base station transmits a resource release indication to the first terminal to inform the first terminal of the uplink resources that can be used by the first terminal, thereby ensuring effective utilization of the uplink resources.

The above operations performed by the first terminal may be separately implemented as a method for uplink data transmission on the first terminal side; the above operations performed by the base station can be separately implemented as a method for uplink data transmission on the access network device side.

In an example based on FIG. 4, the first terminal transmits the first data packet on the first uplink resource. The base station receives the first data packet on the first uplink resource, and when the base station detects that the data packet of the second service type of the second terminal simultaneously exists on the first uplink resource, the base station transmits a scheduling indication to the first terminal, the scheduling indication being used to instruct the first terminal to suspend transmission. The scheduling indication is also used for instructing the first terminal to delay transmitting other data packets to the base station according to multiple candidate scheduling periods. For example, the base station configures three scheduling periods for the first terminal, that is, 2n time units, 4n time units, and 8n time units, where n is an integer greater than 1.

The first terminal receives a scheduling indication, suspends transmission of uplink data before the starting position according to the starting position and the scheduling period in the scheduling indication, and re-determines a second uplink resource for transmission of the uplink data packet according to the target scheduling period after the starting position.

For example, in the initial state, the terminal determines that the minimum scheduling period among the three scheduling periods as the scheduling period used in the current transmission, and the first terminal determines the second uplink resource according to the starting position and the first scheduling period 2n, that is, the first terminal transmits the second data packet on the second uplink resource. After receiving the second data packet and decoding the second data packet, the base station transmits an ACK to the first terminal. After receiving the ACK, the first terminal confirms that the base station has successfully received the second data packet. Therefore, the first terminal does not need to adjust the target scheduling period. The first terminal keeps using the minimum scheduling period as the target scheduling period to determine the third uplink resource for next transmission. The first terminal transmits the third data packet on the third uplink resource, and so on until all data packets are transmitted.

Figure 5:
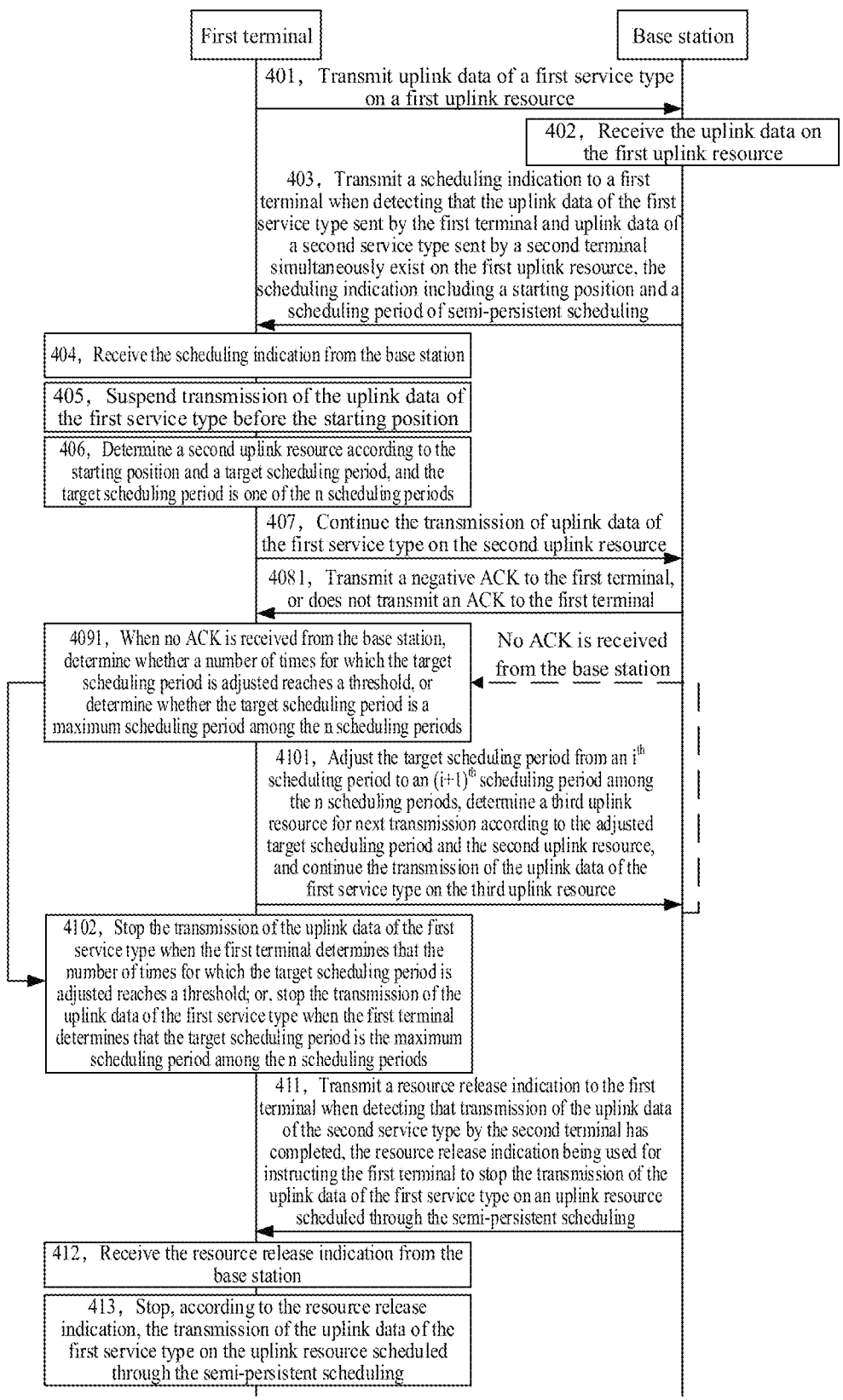
FIG. 5 is a flowchart of a method for uplink data transmission according to another exemplary embodiment of the present disclosure.

In an alternative embodiment based on FIG. 4, as illustrated in FIG. 5, the scheduling indication includes n scheduling periods, where n is an integer greater than 1, and the n scheduling periods of different durations may be arranged in ascending order. The target scheduling period is one of the n scheduling periods, and the target scheduling period is a minimum scheduling period (that is, a first scheduling period) among the n scheduling periods in an initial state, and when the first terminal does not receive the ACK from the base station, the first terminal increases the scheduling period to determine the uplink resource for next transmission. The above operations 408, 409, and 410 may be implemented as operations 4081, 4091, 4101, 4102, and 4103. The alternative operations are as follows.

In 4081, the base station transmits a negative acknowledgement (NACK) to the first terminal, or the base station does not transmit an ACK to the first terminal.

When the base station receives uplink data from the first terminal but cannot decode the uplink data, the base station transmits an NACK or does not transmit an ACK to the first terminal; or, when the base station does not receive uplink data from the first terminal, the base station does not transmit an ACK to the first terminal.

In 4091, when the first terminal does not receive the ACK from the base station, the first terminal determines whether a number of times for which the target scheduling period is adjusted reaches a threshold, or whether the target scheduling period is a maximum scheduling period among the n scheduling periods.

When the first terminal determines that the number of times for which the target scheduling period is adjusted does not reach a threshold (for example, the threshold times is set to 3), or determines that the target scheduling period is not a maximum scheduling period among the n scheduling periods, the first terminal proceeds to operation 4101.

When the first terminal determines that the number of times for which the target scheduling period is adjusted reaches a threshold, or determines that the target scheduling period is a maximum scheduling period among the n scheduling periods, the first terminal proceeds to operation 4102.

In 4101, the first terminal adjusts the target scheduling period from an $i^{th}$ scheduling period to an $(i+1)^{th}$ scheduling period among the n scheduling periods, and determines a third uplink resource for next transmission according to the adjusted target scheduling period and the second uplink resource, and continues the transmission of the uplink data of the first service type on the third uplink resource.

When the first terminal does not receive the ACK from the base station, and the target scheduling period in the initial state is the minimum scheduling period among the n scheduling periods, the first terminal adjusts the target scheduling period from an $i^{th}$ scheduling period to an $(i+1)^{th}$ scheduling period among the n scheduling periods (that is, increases the scheduling period), thereby obtaining the third uplink resource for the next transmission according to the uplink resource (such as the second uplink resource) used at this time and the adjusted target scheduling period; where In an embodiment, in the initial state, the n scheduling periods are arranged in ascending order, the $i^{th}$ scheduling period may be a minimum scheduling period among the n scheduling periods, and the $(i+1)^{th}$ scheduling period is a scheduling period after the $i^{th}$ scheduling period.

The first terminal determines the third uplink resource according to the target scheduling period and the second uplink resource, and determines whether an ACK from the base station can be received when the uplink data is transmitted on the third uplink resource.

When the first terminal receives the ACK from the base station, the first terminal keeps the target scheduling period unchanged and continues to transmit uplink data.

When the first terminal still fails to receive the ACK from the base station, the first terminal proceeds to operation 4091 again.

In 4102, when the first terminal determines that the number of times for which the target scheduling period is adjusted reaches a threshold, the first terminal stops the transmission of the uplink data of the first service type; or, when the first terminal determines that the target scheduling period is the maximum scheduling period of the n scheduling periods, the first terminal stops the transmission of the uplink data of the first service type.

When the first terminal determines that the number of times for which the target scheduling period is adjusted reaches a threshold, and still fails to receive the ACK from the base station, the first terminal stops the transmission of the uplink data of the first service type; or, when the first terminal determines that the target scheduling period is the maximum scheduling period among the n scheduling periods, and still fails to receive the ACK from the base station, the first terminal stops the transmission of the uplink data of the first service type.

In summary, in the method provided in this embodiment, when the first terminal does not receive the ACK from the base station, the target scheduling period needs to be adjusted, so that the first terminal can receive the ACK according to the adjusted target scheduling period. When the first terminal still fails to receive the ACK according to the adjusted target scheduling period, the first terminal needs to continue to adjust the target scheduling period until the number of times for which the target scheduling period is adjusted reaches a threshold or the target scheduling period is the maximum scheduling period among the n scheduling periods, and the first terminal stops the transmission of the uplink data of the first service type, so as to avoid the problem that a transmission conflict occurs due to the first terminal performs multiple transmissions.

The above operations performed by the first terminal may be separately implemented as a method for uplink data transmission on the first terminal side; the above operations performed by the base station can be separately implemented as a method for uplink data transmission on the access network device side.

In an alternative schematic example based on FIG. 5, a situation in which the first terminal transmits the third data packet on the third uplink resource is schematically illustrated.

In an embodiment, the base station configures four scheduling periods for the first terminal, which are 2n, 4n, 8n, and 16n, respectively, and n is an integer greater than 1.

When the scheduling period is 2n, the first terminal determines, according to the scheduling period and the starting position, the position of the second uplink resource for next transmission, and the first terminal transmits a second data packet on the second uplink resource. After transmitting the second data packet, the first terminal does not receive the ACK from the base station and determines that the base station fails to receive the second data packet successfully. The first terminal adjusts the scheduling period, and the adjusted scheduling period is 4n.

The first terminal determines a third uplink resource for next transmission according to the scheduling period 4n and the second uplink resource, and the first terminal transmits a third data packet on the third uplink resource. If the first terminal still fails to receive the ACK from the base station, the scheduling period is adjusted to 8n, the first terminal determines the third uplink resource for the next transmission according to the scheduling period 8n and the second uplink resource, and the first terminal transmits the third data packet on the third uplink resource. If the first terminal still fails to receive the ACK from the base station, the scheduling period is adjusted to 16n, the first terminal determines the third uplink resource for the next transmission according to the scheduling period 16n and the second uplink resource, and the first terminal transmits the third data packet on the third uplink resource.

When the scheduling period is 16n, if the first terminal still fails to receive the ACK from the base station and the number of times for which the target scheduling period is adjusted by the first terminal reaches a set threshold, i.e., 3 times, the first terminal stops the transmission of the third data packet; or, the first terminal continues to adjust the adjusted scheduling period 16n, and the first terminal stops the transmission of the third data packet.

In some embodiments of the present disclosure, the scheduling indication from the base station to the first terminal includes a starting position and a scheduling period of semi-persistent scheduling. The scheduling period includes n scheduling periods of different durations, n being an integer greater than 1, and the n scheduling periods of different durations may be arranged in descending order. The target scheduling period is one of the n scheduling periods, and the target scheduling period is a maximum scheduling period (that is, a first scheduling period) among the n scheduling periods. When the first terminal receives the ACK from the base station, the first terminal decreases the scheduling period to determine the uplink resource for next transmission.

Figure 6:
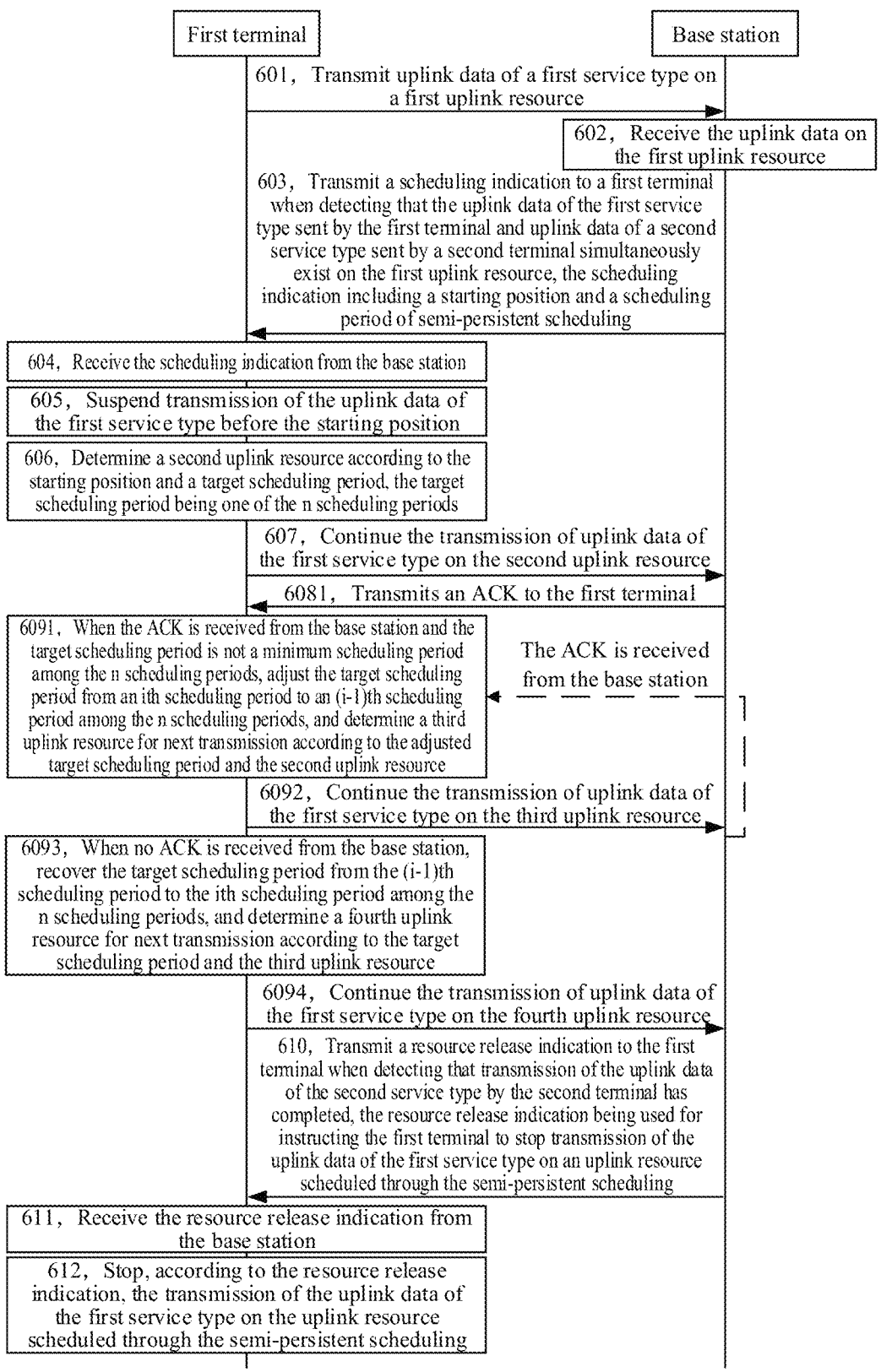
FIG. 6 is a flowchart of a method for uplink data transmission according to yet another exemplary embodiment of the present disclosure.

FIG. 6 is a flowchart of a method for uplink data transmission according to another exemplary embodiment. The method can be applied to the implementation environment illustrated in FIG. 1. In this embodiment, for example, an access network device is a base station, a first terminal is used for transmitting a first type of service, and a second terminal is used for transmitting a second type of service. The priority of the second type of service is higher than a priority of the first type of service. The contents of operations 601 to 607 are the same as those of operations 401 to 407, and thus are not repeated in this embodiment. Therefore, this embodiment starts from operation 6081, and the method includes the following operations.

In 6081, the base station transmits an ACK to the first terminal.

When the base station receives uplink data transmitted from the first terminal and can successfully decode the uplink data, the base station transmits the ACK to the first terminal.

In 6091, when the first terminal receives the ACK from the base station and the target scheduling period is not a minimum scheduling period among the n scheduling periods, the first terminal adjusts the target scheduling period from an $i^{th}$ scheduling period to an $(i-1)^{th}$ scheduling period among the n scheduling periods, and determines a third uplink resource for next transmission according to the adjusted target scheduling period and the second uplink resource.

The first terminal receives the ACK from the base station, and determines that the base station has received the uplink data and has decoded the uplink data. When the target scheduling period in an initial state is not the minimum scheduling period among the n scheduling periods, the first terminal adjusts the target scheduling period so as to reduce the overhead of the second uplink resource.

The first terminal adjusts the target scheduling period from an $i^{th}$ scheduling period to an $(i-1)^{th}$ scheduling period among the n scheduling periods, and determine a third uplink resource for next transmission according to the adjusted target scheduling period and the second uplink resource; where $0 \leq i \leq n-1$.

In an embodiment, in the initial state, the n scheduling periods are arranged in descending order, the $i^{th}$ scheduling period may be a maximum scheduling period among the n scheduling periods, and the $(i-1)^{th}$ scheduling period is a scheduling period after the $i^{th}$ scheduling period.

The first terminal determines the third uplink resource for the next transmission according to the adjusted target scheduling period and the second uplink resource.

In 6092, the first terminal continues transmission of uplink data of the first service type on the third uplink resource.

When the first terminal receives the ACK from the base station, the first terminal proceeds to operation 6091; when the first terminal does not receive the ACK from the base station, the process proceeds to operation 6093.

In 6093, when the first terminal does not receive the ACK from the base station, the first terminal recovers the target scheduling period from the $(i-1)^{th}$ scheduling period to the $i^{th}$ scheduling period among the n scheduling periods, and determines a fourth uplink resource for next transmission according to the target scheduling period and the third uplink resource.

When the first terminal transmits uplink data on the third uplink resource and does not receive the ACK from the base station, it indicates that the base station fails to successfully receive the uplink data from the third uplink resource, that is, the base station receives the uplink data but fails to decode the uplink data, or the base station does not receive the uplink data.

When the first terminal does not receive the ACK from the base station, it indicates that the first terminal fails to receive the ACK from the base station by using the $(i-1)^{th}$ scheduling period and that the first terminal needs to recover the scheduling period to the $i^{th}$ scheduling period, that is, the first terminal recovers the target scheduling period from the $(i-1)^{th}$ scheduling period to the $i^{th}$ scheduling period among the n scheduling periods.

The first terminal determines the fourth uplink resource for next transmission according to the recovered target scheduling period and the third uplink resource.

In 6094, the first terminal continues transmission of uplink data of the first service type on the fourth uplink resource.

The first terminal transmits uplink data of the first service type on the fourth uplink resource until transmission of the uplink data of the first service type completes.

The contents of operations 610 to 612 are the same as those of operations 411 to 413, and thus are not repeated in this embodiment.

In summary, in the method provided in the present embodiment, when the $i^{th}$ scheduling period is selected as the target scheduling period, the first terminal may implement transmission on the third uplink resource. The first terminal uses the $(i-1)^{th}$ scheduling period after the $i^{th}$ scheduling period as the target scheduling period, and performs transmission on the third uplink resource, thereby reducing the overhead of the uplink resource. When the transmission on the third uplink resource cannot be implemented based on the adjusted target scheduling period, the first terminal adjusts the target scheduling period from the $(i-1)^{th}$ scheduling period to the scheduling period to ensure transmission of uplink data.

The above operations performed by the first terminal may be separately implemented as a method for uplink data transmission on the first terminal side; the above operations performed by the base station can be separately implemented as a method for uplink data transmission on the access network device side.

In an alternative schematic example based on FIG. 6, a situation in which the first terminal transmits a data packet on the third uplink resource and the fourth uplink resource is schematically illustrated.

In an embodiment, four scheduling periods are set, which are 2n, 4n, 8n, and 16n, respectively, and n is an integer greater than 1.

When the scheduling period is 8n, the first terminal determines the position of the second uplink resource for next transmission according to the scheduling period and the starting position, and the first terminal transmits the second data packet on the second uplink resource. After transmitting the second data packet, the first terminal receives the ACK from the base station, and determines that the base station has successfully received the second data packet and the 8n is not the minimum scheduling period among the four scheduling periods, and then the first terminal adjusts the scheduling period from 8n to 4n. The first terminal determines a third uplink resource for next transmission according to the scheduling period 4n and the second uplink resource, and the first terminal transmits a third data packet on the third uplink resource.

If the first terminal receives the ACK from the base station after transmitting the third data packet, the first terminal adjusts the scheduling period from 4n to 2n. The first terminal determines a third uplink resource for next transmission according to the scheduling period 2n and the second uplink resource, and the first terminal transmits the third data packet on the third uplink resource.

If the first terminal does not receive the ACK from the base station after transmitting the third data packet, the first terminal recovers the scheduling period to 4n. The first terminal determines a third uplink resource for next transmission according to the scheduling period 4n and the second uplink resource, and the first terminal transmits the third data packet on the third uplink resource.

Figure 7:
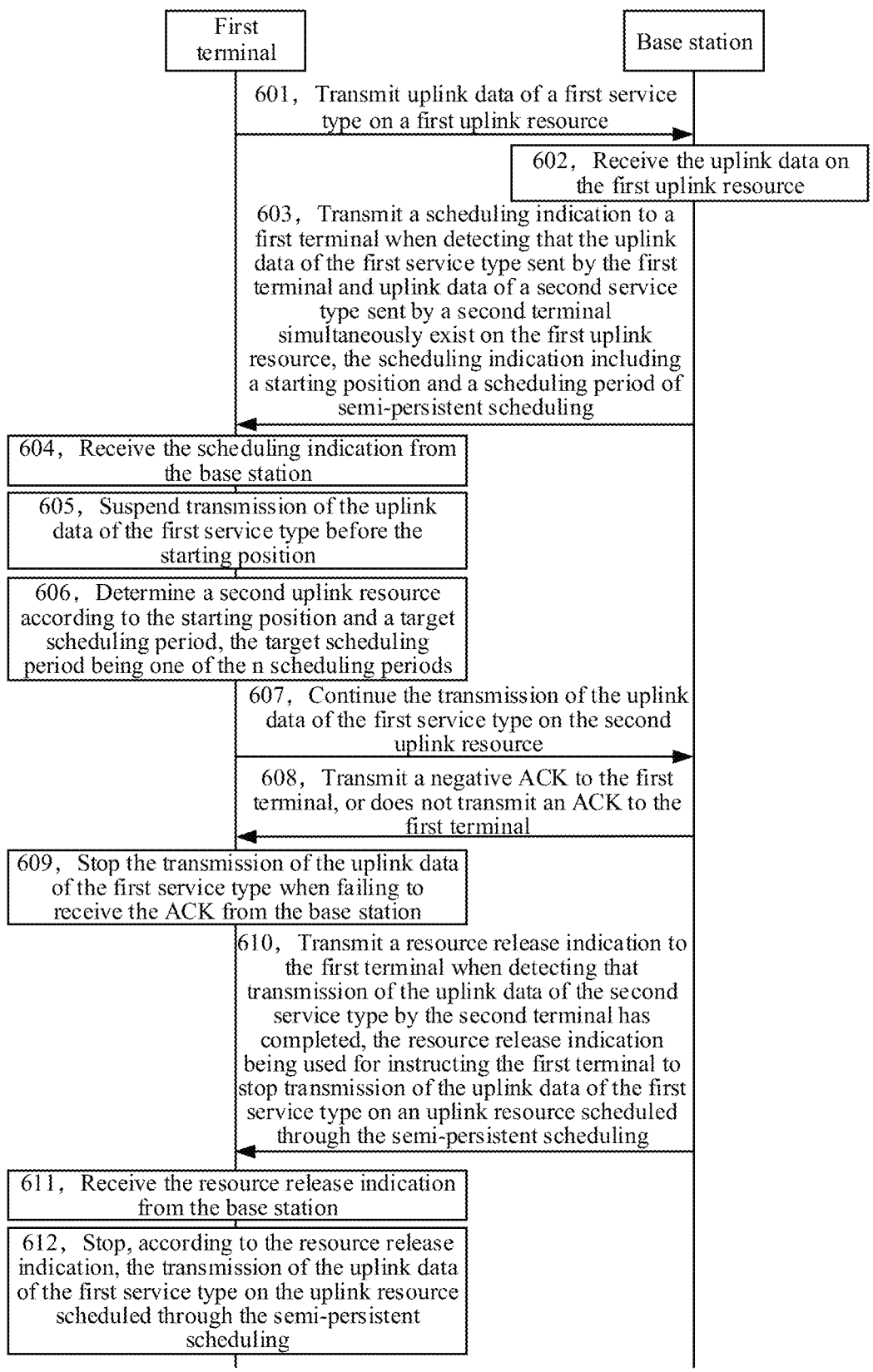
FIG. 7 is a flowchart of a method for uplink data transmission according to still another exemplary embodiment of the present disclosure.

In an alternative embodiment based on FIG. 6, as illustrated in FIG. 7, the scheduling indication includes n scheduling periods, where n is an integer greater than 1, and the n scheduling periods of different durations may be arranged in descending order. The target scheduling period is one of the n scheduling periods, and the target scheduling period is a maximum scheduling period (that is, a first scheduling period) among the n scheduling periods in an initial state, and when the first terminal does not receive the ACK from the base station, the first terminal stops the transmission. The above operations 6081, 6091, 6092, 6093 and 6094 may be implemented as operations 608 and 609. The alternative operations are as follows.

In 608, the base station transmits a negative ACK (NACK) to the first terminal; or, the base station does not transmit an ACK to the first terminal.

When the base station receives uplink data from the first terminal but cannot decode the uplink data, the base station transmits an NACK to the first terminal; or, when the base station does not receive uplink data from the first terminal, the base station does not transmit an ACK to the first terminal.

In 609, the first terminal stops the transmission of the uplink data of the first service type when the first terminal does not receive the ACK from the base station.

When the target scheduling period is a maximum scheduling period among n scheduling periods, the first terminal determines a position of the second uplink resource according to the target scheduling period and a starting position, and transmits uplink data on the second uplink resource. When the first terminal fails to receive an ACK from the base station, the first terminal determines that the base station has not successfully received the uplink data, and the first terminal stops the transmission of the uplink data of the first service type.

In summary, in the method provided in the present embodiment, the target scheduling period is the maximum scheduling period among n scheduling periods, and the first terminal transmits the uplink data of the first service type by using the maximum scheduling period. If the transmission is not successful, it indicates that the first terminal cannot transmit the uplink data of the first service type on the second uplink resource, so that the first terminal stops the transmission of the uplink data of the first service type.

The above operations performed by the first terminal may be separately implemented as a method for uplink data transmission on the first terminal side; the above operations performed by the base station can be separately implemented as a method for uplink data transmission on the access network device side.

In an alternative schematic example based on FIG. 7, a situation in which the first terminal transmits the second data packet on the second uplink resource is schematically illustrated.

In an embodiment, four scheduling periods are set, which are 2n, 4n, 8n, and 16n, respectively, and n is an integer greater than 1.

When the scheduling period is 16n, the scheduling period is a maximum scheduling period among the four scheduling periods, the first terminal determines a second uplink resource for next transmission according to the scheduling period and a starting position, and the first terminal transmits the second data packet on the second uplink resource. After transmitting the second data packet, when the first terminal does not receive the ACK from the base station, the first terminal determines that the base station has not successfully received the second data packet. Since the first terminal does not have an adjustable scheduling period, the first terminal stops the transmission of the second data packet.

The following is an example of the device of the present disclosure, which can be used to carry out the method embodiments of the present disclosure. For details not disclosed in the device embodiments of the present disclosure, reference is made to the method embodiments of the present disclosure.

Figure 8:
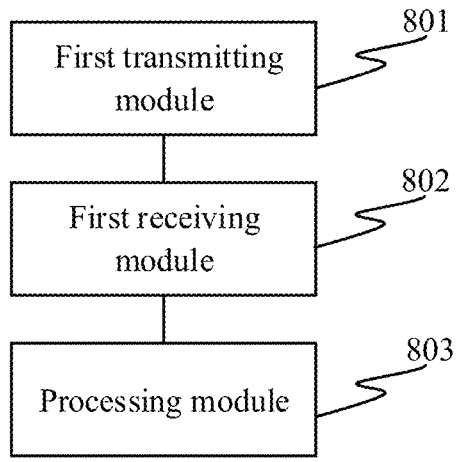
FIG. 8 is a schematic structural diagram of an apparatus in a first terminal according to an exemplary embodiment of the present disclosure.

FIG. 8 is a schematic structural diagram of an apparatus in a first terminal according to an exemplary embodiment of the present disclosure. In this embodiment, for example, an access network device is a base station, a first terminal is configured for transmitting a first type of service, and a second terminal is configured for transmitting a second type of service. The priority of the second type of service is higher than a priority of the first type of service. The apparatus includes a first transmitting module 801, a first receiving module 802 and a processing module 803.

The first transmitting module 801 is configured to transmit uplink data of a first service type on a first uplink resource.

The first terminal transmits an SR to a base station for requesting, from the base station, uplink resources for transmission of the first type of service. The base station allocates a first uplink resource to the first terminal according to the SR sent by the first terminal, and the first terminal transmits uplink data of the first service type on the allocated first uplink resource. In an embodiment, the base station allocates the first uplink resource to the first terminal in dynamic scheduling or semi-persistent scheduling.

In an embodiment, because the priority of the uplink data of the second service type is higher, the second terminal initiates the transmission of the uplink data of the second service type at any time according to the requirement of the second terminal, and the first terminal and the second terminal may transmit their respective uplink data in a multiplexed form on the first uplink resource, thereby causing a conflict during transmission.

The first receiving module 802 is configured to receive a scheduling indication from a base station. The scheduling indication includes a starting position and a scheduling period of semi-persistent scheduling.

The first terminal receives a scheduling indication from the base station, and obtains a starting position and a scheduling period of the semi-persistent scheduling from the scheduling indication.

In an embodiment, the starting position is a sub-frame in which the scheduling indication is located; or the starting position is a sub-frame in which the first uplink resource is located.

In an embodiment, the scheduling period may be configured as one or more, and the present embodiment does not limit the number of scheduling periods and whether the scheduling periods are the same. In some embodiments, more than two scheduling periods are configured, and the terminal may select according to a policy in two scheduling periods. For example, the scheduling periods includes n, 2n, and 4n.

The processing module 803 is configured to suspend transmission of the uplink data of the first service type before the starting position.

The first transmitting module 801 is further configured to continue the transmission of the uplink data of the first service type according to the scheduling period after the starting position.

After the starting position, the first terminal further determines an uplink resource for next transmission according to the starting position and the scheduling period, and continues the transmission of the uplink data of the first service type on the uplink resource.

The scheduling indication is sent by the base station after detecting that a second terminal transmits uplink data of a second service type on the first uplink resource, and a priority of the second service type is higher than a priority of the first service type.

In summary, in the device provided in this embodiment, the first terminal determines a scheduling starting position and a scheduling period according to a scheduling indication. The first terminal suspends and continues transmission of the uplink data according to the scheduling starting position and the scheduling period, so that transmission of the uplink data of a first service type (such as a eMBB service) can stagger transmission of the uplink data of a second service type (such as a uRLLC service), thereby avoiding a problem of transmission conflict between the first type of service and the second type of service, and enabling the first type of service with a low priority to transmit after transmission of the second type of service with a high priority is completed, thereby ensuring a transmission delay requirement of the second type of service with a high priority.

Figure 9:
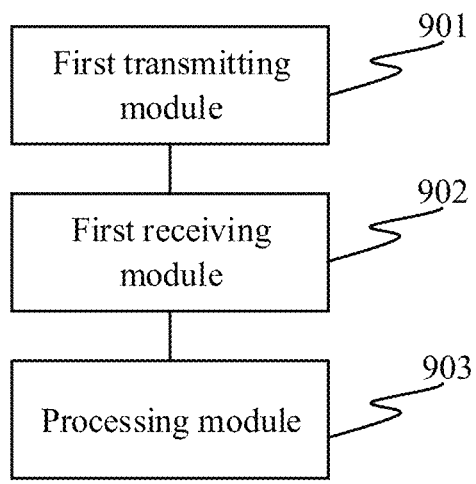
FIG. 9 is a schematic structural diagram of an apparatus in a first terminal according to another exemplary embodiment of the present disclosure.

FIG. 9 is a schematic structural diagram of an apparatus in a first terminal according to another exemplary embodiment of the present disclosure. In this embodiment, for example, an access network device is a base station, a first terminal is configured for transmitting a first type of service, and a second terminal is configured for transmitting a second type of service. The priority of the second type of service is higher than a priority of the first type of service. The apparatus includes a first transmitting module 901, a first receiving module 902 and a processing module 903.

The first transmitting module 901 is configured to transmit uplink data of the first service type on the first uplink resource.

The first terminal transmits an SR to a base station for requesting uplink resources for transmission of the first service type from the base station. The base station allocates a first uplink resource to the first terminal according to the SR sent by the first terminal, and the first terminal transmits uplink data of the first service type on the allocated first uplink resource. In an embodiment, the base station allocates the first uplink resource to the first terminal in dynamic scheduling or semi-persistent scheduling.

In an embodiment, because the priority of the uplink data of the second service type is higher, the second terminal initiates the transmission of the uplink data of the second service type at any time according to the requirement of the second terminal, and the first terminal and the second terminal may transmit their respective uplink data in a multiplexed form on the first uplink resource, thereby causing a conflict during transmission.

The first receiving module 902 is configured to receive a scheduling indication from a base station. The scheduling indication includes a starting position and a scheduling period of semi-persistent scheduling.

The first terminal receives a scheduling indication from the base station, and obtains a starting position and a scheduling period of the semi-persistent scheduling from the scheduling indication.

In an embodiment, the starting position is a sub-frame in which the scheduling indication is located; or the starting position is a sub-frame in which the first uplink resource is located.

In an embodiment, the scheduling period may be configured as one or more, and the present embodiment does not limit the number of scheduling periods and whether each scheduling period is the same. In some embodiments, more than two scheduling periods are configured, and the terminal may select according to a policy in two scheduling periods. For example, the scheduling periods includes n, 2n, and 4n.

The processing module 903 is configured to suspend transmission of the uplink data of the first service type before the starting position.

The first transmitting module 901 is further configured to continue the transmission of the uplink data of the first service type according to the scheduling period after the starting position.

After the starting position, the first terminal further determines an uplink resource for next transmission according to the starting position and a scheduling period, and continues the transmission of the uplink data of the first service type on the uplink resource.

The scheduling indication is sent by the base station after detecting that a second terminal transmits uplink data of a second service type on the first uplink resource, and a priority of the second service type is higher than a priority of the first service type.

In an embodiment, the starting position is a sub-frame in which the scheduling indication is located; or the starting position is a sub-frame in which the first uplink resource is located.

In an embodiment, the scheduling period includes n scheduling periods of different durations, n being an integer greater than 1.

The processing module 903 is further configured to determine a second uplink resource according to the starting position and a target scheduling period, and the target scheduling period is one of the n scheduling periods.

After the starting position, the first terminal determines the time-frequency position for transmitting the uplink data of the first service type again according to the starting position and the target scheduling period in the scheduling indication.

When two or more scheduling periods are configured, in the initial state, the terminal may determine that the target scheduling period is a minimum scheduling period among the n scheduling periods. In other words, the terminal defaults the minimum scheduling period among multiple scheduling periods as the scheduling period used in the current transmission.

The first terminal determines a second uplink resource for the next transmission of uplink data of the first service type according to the starting position and the target scheduling period.

The first transmitting module 901 is further configured to continue transmission of uplink data of the first service type on the second uplink resource.

In a possible implementation, the target scheduling period is the minimum scheduling period among the n scheduling periods in the initial state.

The processing module 903 is configured to determine a third uplink resource for next transmission according to the target scheduling period and the second uplink resource when receiving the ACK from the base station.

When the first terminal receives the ACK from the base station, the first terminal determines that the base station has received the uplink data and has decoded the uplink data.

When the target scheduling period in the initial state is the minimum scheduling period among the n scheduling periods, the first terminal keeps the target scheduling period unchanged, and continues to use the target scheduling period for next transmission, so that uplink data of the first service type can be received by the base station as soon as possible.

For example, the first terminal may determine the third uplink resource for the next transmission according to the target scheduling period and the second uplink resource.

The first transmitting module 901 is further configured to continue transmission of the uplink data of the first service type on the third uplink resource.

The processing module 903 is further configured to, when no ACK is received from the base station, adjust the target scheduling period from an $i^{th}$ scheduling period to an $(i+1)^{th}$ scheduling period among the n scheduling periods, and determine a third uplink resource for next transmission according to the adjusted target scheduling period and the second uplink resource; where 0≤i≤n−1.

When the first terminal does not receive the ACK from the base station, and the target scheduling period in the initial state is the minimum scheduling period among the n scheduling periods, the first terminal adjusts the target scheduling period from an $i^{th}$ scheduling period to an $(i+1)^{th}$ scheduling period among the n scheduling periods (that is, increases the scheduling period), thereby obtaining the third uplink resource for the next transmission according to the uplink resource (such as the second uplink resource) used at this time and the adjusted target scheduling period; where In an embodiment, in the initial state, the n scheduling periods are arranged in ascending order, the $i^{th}$ scheduling period may be a minimum scheduling period among the n scheduling periods, and the $(i+1)^{th}$ scheduling period is a scheduling period after the $i^{th}$ scheduling period.

When the first terminal determines that the number of times for which the target scheduling period is adjusted does not reach a threshold (for example, set the threshold number of times to 3 times), or determines that the adjusted target scheduling period is not a maximum scheduling period of the n scheduling periods, the first terminal continues to adjust the target scheduling period. When the first terminal determines that the number of times for which the target scheduling period is adjusted reaches a threshold, or determines that the adjusted target scheduling period is a maximum scheduling period among the n scheduling periods, the first terminal stops the transmission of the uplink data of the first service type.

The processing module 903 is further configured to stop the transmission of the uplink data of the first service type when no ACK is received from the base station and the number of times for which the target scheduling period is adjusted reaches a threshold; or, the processing module 903 is further configured to stop the transmission of the uplink data of the first service type when no ACK is received from the base station and the target scheduling period is a maximum scheduling period among the n scheduling periods.

When the first terminal determines that the number of times for which the target scheduling period is adjusted reaches a threshold, and still fails to receive the ACK from the base station, the first terminal stops the transmission of the uplink data of the first service type; or, when the first terminal determines that the target scheduling period is the maximum scheduling period among the n scheduling periods, and still fails to receive the ACK from the base station, the first terminal stops the transmission of the uplink data of the first service type.

In a possible implementation, the target scheduling period is the maximum scheduling period among the n scheduling periods in the initial state.

The processing module 903 is further configured to, when the ACK from the base station is received and the target scheduling period is not a minimum scheduling period among the n scheduling periods, adjust the target scheduling period from an $i^{th}$ scheduling period to an $(i-1)^{th}$ scheduling period among the n scheduling periods, and determine a third uplink resource for next transmission according to the target scheduling period and the second uplink resource; where The first terminal receives the ACK from the base station, and determines that the base station has received the uplink data and has decoded the uplink data. When the target scheduling period in an initial state is not the minimum scheduling period among the n scheduling periods, the first terminal adjusts the target scheduling period so as to reduce the overhead of the second uplink resource.

The first terminal adjusts the target scheduling period from an $i^{th}$ scheduling period to an $(i-1)^{th}$ scheduling period among the n scheduling periods, and determine a third uplink resource for next transmission according to the adjusted target scheduling period and the second uplink resource; where In an embodiment, in the initial state, the n scheduling periods are arranged in descending order, the $i^{th}$ scheduling period may be a maximum scheduling period among the n scheduling periods, and the $(i-1)^{th}$ scheduling period is a scheduling period located after the $i^{th}$ scheduling period.

The first terminal determines the third uplink resource for the next transmission according to the adjusted target scheduling period and the second uplink resource.

The first transmitting module 901 is further configured to continue transmission of uplink data of the first service type on the third uplink resource.

The processing module 903 is further configured to, when no ACK is received from the base station, recover the target scheduling period from the $(i-1)^{th}$ scheduling period to the $i^{th}$ scheduling period among the n scheduling periods, and determine the fourth uplink resource for the next transmission according to the target scheduling period and the third uplink resource.

When the first terminal transmits uplink data on the third uplink resource and does not receive the ACK from the base station, it indicates that the base station fails to receive the uplink data from the third uplink resource, that is, the base station receives the uplink data but fails to decode the uplink data, or the base station does not receive the uplink data.

When the first terminal does not receive the ACK from the base station, it indicates that the first terminal fails to receive the ACK from the base station by using the $(i-1)^{th}$ scheduling period, and the first terminal needs to recover the scheduling period to the $i^{th}$ scheduling period; that is, the first terminal recovers the target scheduling period from the $(i-1)^{th}$ scheduling period to the $i^{th}$ scheduling period among the n scheduling periods.

The first terminal determines the fourth uplink resource for the next transmission according to the recovered target scheduling period and the third uplink resource.

The first transmitting module 901 is further configured to continue transmission of uplink data of the first service type on the fourth uplink resource.

The first terminal transmits uplink data of the first service type on the fourth uplink resource until transmission of the uplink data of the first service type completes.

The processing module 903 is further configured to stop the transmission of the uplink data of the first service type when the first terminal does not receive the ACK from the base station.

When the target scheduling period is a maximum scheduling period among n scheduling periods, the first terminal determines a position of the second uplink resource according to the target scheduling period and a starting position, and transmits uplink data on the second uplink resource. When the first terminal fails to receive an ACK from the base station, the first terminal determines that the base station has not successfully received the uplink data, and the first terminal stops the transmission of the uplink data of the first service type.

The first receiving module 902 is further configured to receive the resource release indication from the base station.

The processing module 903 is configured to, according to the resource release indication, stop the transmission of the uplink data of the first service type on an uplink resource scheduled through the semi-persistent scheduling.

In an embodiment, when transmission of the uplink data of the first service type has not completed, the base station may further allocate other time-frequency resources to the first terminal for transmission of the uplink data in a dynamic scheduling or other semi-persistent scheduling manners.

In summary, in the device provided in this embodiment, a first terminal determines a scheduling starting position and a scheduling period according to a scheduling instruction. The first terminal suspends and continues transmission of the uplink data according to the scheduling starting position and the scheduling period, so that transmission of the uplink data of a first service type (such as a eMBB service) can stagger transmission of the uplink data of a second service type (such as a uRLLC service), thereby avoiding a problem of transmission conflict between the first type of service and the second type pf service, and enabling a first service type with a low priority to transmit after transmission of the second service type with a high priority is completed, thereby ensuring a transmission delay requirement of the second service type with a high priority.

In the device provided in the present embodiment, a first terminal determines a second uplink resource according to a starting position and a target scheduling period (i.e., a minimum scheduling period among multiple scheduling periods), and keeps the target scheduling period unchanged when receiving an ACK, and then determines an uplink resource for subsequent transmission according to the target scheduling period, thereby ensuring that uplink data of a first service type can be transmitted to a base station as soon as possible.

In the device provided in this embodiment, when the first terminal does not receive the ACK from the base station, the target scheduling period needs to be adjusted, so that the first terminal can receive the ACK according to the adjusted target scheduling period. When the first terminal still fails to receive the ACK according to the adjusted target scheduling period, the first terminal needs to continue to adjust the target scheduling period until the number of times for which the target scheduling period is adjusted reaches a threshold or the target scheduling period is the maximum scheduling period among the n scheduling periods, and the first terminal stops the transmission of the uplink data of the first service type, so as to avoid the problem that the first terminal performs multiple transmissions but generates a transmission conflict.

In the device provided in the present embodiment, when the $i^{th}$ scheduling period is selected as the target scheduling period, the first terminal may implement transmission on the third uplink resource. The first terminal uses the $(i-1)^{th}$ scheduling period located after the $i^{th}$ scheduling period as the target scheduling period, and performs transmission on the third uplink resource, thereby reducing the overhead of the uplink resource. When the transmission on the third uplink resource cannot be implemented based on the adjusted target scheduling period, the first terminal adjusts the target scheduling period from the $(i-1)^{th}$ scheduling period to the scheduling period to ensure transmission of uplink data.

In the device provided in the present embodiment, the target scheduling period is the maximum scheduling period among n scheduling periods, and the first terminal transmits the uplink data of the first service type by using the maximum scheduling period. If the transmission is not successful, it indicates that the first terminal cannot transmit the uplink data of the first service type on the second uplink resource, so that the first terminal stops the transmission of the uplink data of the first service type.

Figure 10:
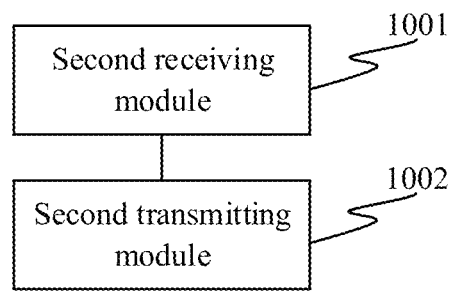
FIG. 10 is a schematic structural diagram of an apparatus in an access network device according to an exemplary embodiment of the present disclosure.

FIG. 10 is a schematic structural diagram of an apparatus in an access network device according to an exemplary embodiment of the present disclosure. In this embodiment, for example, an access network device is a base station, a first terminal is configured to transmit a first type of service, and a second terminal is configured to transmit a second type of service The priority of the second type of service is higher than a priority of the first type of service. The device includes a second receiving module 1001 and a second transmitting module 1002.

The second receiving module 1001 is configured to receive uplink data on a first uplink resource.

The second transmitting module 1002 is configured to transmit a scheduling indication to a first terminal when detecting that uplink data of a first service type sent by a first terminal and uplink data of a second service type sent by a second terminal simultaneously exist on the first uplink resource, where the scheduling indication includes a starting position and a scheduling period of semi-persistent scheduling. The priority of the second service type is higher than a priority of the first service type.

The base station detects the first service type identifier and the second service type identifier when the base station simultaneously receives uplink data transmitted from the first terminal and uplink data transmitted from the second terminal on the first uplink resource. In an embodiment, the base station determines, according to the first service type identifier and the second service type identifier, that the priority of the second service type is higher than the priority of the first service type. For example, the priority of the uRLLC service is higher than the priority of the eMBB service.

The base station transmits a scheduling indication to the first terminal according to the first service type identifier to instruct the first terminal to stagger transmission of the second service type on the next uplink resource. The scheduling indication includes a starting position and a scheduling period of the semi-persistent scheduling. The first terminal delays transmission of the uplink data of the first service type according to the scheduling indication.

The base station preferentially ensures transmission of data of the second service type according to the second service type identifier.

The second transmitting module 1002 is configured to transmit a resource release indication to the first terminal when it is detected that transmission of the uplink data of the second service type by the second terminal has completed, the resource release indication being used for instructing the first terminal to stop transmission of the uplink data of the first service type on an uplink resource scheduled through the semi-persistent scheduling.

When transmission of the uplink data of the second service type by the second terminal has completed, the base station may transmit a resource release indication to the first terminal, and the resource release indication is used for instructing the first terminal to stop transmission of the uplink data of the first service type on an uplink resource scheduled through the semi-persistent scheduling.

In summary, in the device provided in this embodiment, a first terminal determines a scheduling starting position and a scheduling period according to a scheduling indication. The first terminal suspends and continues transmission of the uplink data according to the scheduling starting position and the scheduling period, so that transmission of the uplink data of a first service type (such as a eMBB service) can stagger transmission of the uplink data of a second service type (such as a uRLLC service), thereby avoiding a problem of transmission conflict between the first type of service and the second type of service, and enabling a first type of service with a low priority to transmit after transmission of the second type of service with a high priority is completed, thereby ensuring a transmission delay requirement of the second type of service with a high priority.

In the device provided in this embodiment, after detecting that transmission of the uplink data of the second service type by the second terminal has completed, the base station transmits a resource release indication to the first terminal to inform the first terminal of the uplink resources that can be used by the first terminal, thereby ensuring effective utilization of the uplink resources.

It should be noted that in the device for uplink data transmission according to the above embodiments, the division of the above functional modules is only used as an example to describe the uplink data transmission. In practical application, the function allocation may be performed by different functional modules, that is, the internal structure of the apparatus is divided into different functional modules to perform all or some of the functions described above. In addition, the apparatus for the uplink data transmission provided in the above embodiments and the method for the uplink data transmission belong to the same concept. For a specific implementation process thereof, refer to the method embodiments. Details are not repeated herein.

It should be noted that the transmitting module in the foregoing embodiments may be implemented by a communication chip, or may be implemented in cooperation with a communication chip and a processor. And/or, the receiving module in the above embodiments may be implemented by a communication chip, or may be implemented in cooperation with a communication chip and a processor.

Figure 11:
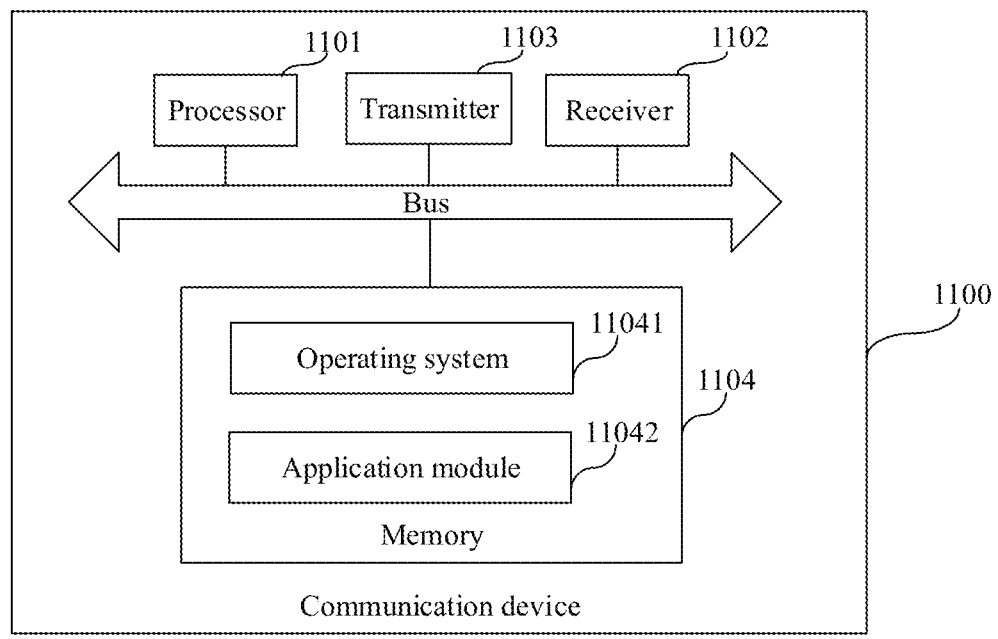
FIG. 11 is a block diagram of a communication device according to an exemplary embodiment of the present disclosure.

FIG. 11 is a block diagram of a communication device 1100 according to an exemplary embodiment of the present disclosure. For example, the communication device 1100 may be a first terminal or an access network device. As illustrated in FIG. 11, the communication device 1100 may include a processor 1101, a receiver 1102, a transmitter 1103, and a memory 1104. The receiver 1102, the transmitter 1103, and the memory 1104 are connected to the processor 1101 via a bus, respectively.

The processor 1101 includes one or more processing cores, and the processor 1101 executes the method performed by the first terminal or the access network device in the methods for uplink data transmission provided in the embodiments of the present disclosure by running a software program and a module. The memory 1104 may be configured to store software programs and modules. Specifically, the memory 1104 may store an operating system 11041, an application module 11042 required for at least one function. The receiver 1102 is configured to receive communication data transmitted by other devices, and the transmitter 1103 is configured to transmit the communication data to the other devices.

Figure 12:
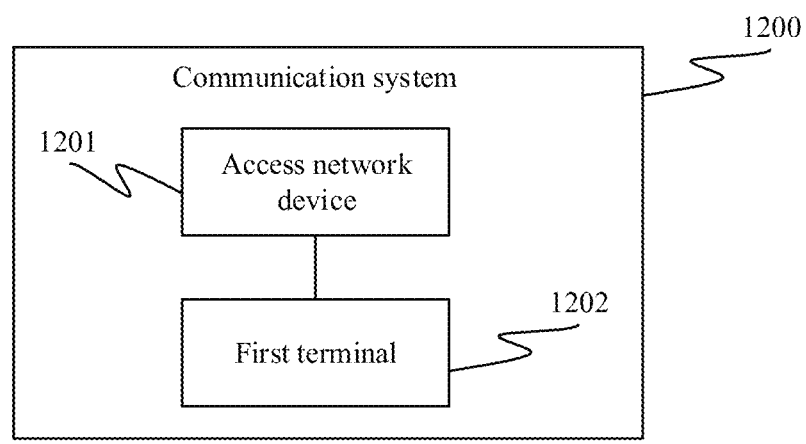
FIG. 12 is a block diagram of a communication system according to an exemplary embodiment of the present disclosure.

FIG. 12 is a block diagram of a communication system 1200 according to an exemplary embodiment of the present disclosure. As illustrated in FIG. 12, the communication system 1200 includes an access network device 1201 and a first terminal 1202.

The first access network device 1201 and the terminal 1202 are configured to perform the method for uplink data transmission executed in the embodiment illustrated in FIG. 4.

In an exemplary embodiment, a computer-readable storage medium is also provided. The computer-readable storage medium is a non-transitory computer-readable storage medium in which a computer program is stored. The computer program, when executed by a processing component, causes the processing component to perform the method for feedback information transmission provided in the above-described embodiments of the present disclosure.

The disclosed embodiments also provide a computer program product having stored therein instructions that, when executed by a computer, causes the computer to perform the method for feedback information transmission provided in the above-described embodiments of the present disclosure.

Embodiments of the present disclosure also provide a chip, which includes a programmable logic circuit and/or program instructions that, when running, performs the method for feedback information transmission provided in the above-described embodiments of the present disclosure.

It is to be understood that reference herein to "multiple" refers to two or more. The term "and/or" as used herein is merely used for describing an association between associated objects, it means that there may be three relationships, e.g., A and/or B, which may mean that A alone, both A and B, and B alone, are present. The character "/" generally indicates that the associated objects are in an "or" relationship.

It will be appreciated by those of ordinary skill in the art that all or a part of the operations of implementing the above-described embodiments may be performed by hardware, or may be performed by a program instructing relevant hardware. The program may be stored in a computer-readable storage medium, which may be a read-only memory, a magnetic disk, an optical disk, or the like.

The foregoing description is merely exemplary embodiments of the present disclosure, and is not intended to limit the present disclosure. Any modifications, equivalents, modifications and the like, which fall within the spirit and principles of the present disclosure, are intended to be included within the scope of the present disclosure.

What is claimed is:

1. A method for uplink data transmission, comprising:
transmitting, by a first terminal, uplink data of a first service type on a first uplink resource;
receiving, by the first terminal, a scheduling indication from an access network device, wherein the scheduling indication comprises a starting position and a scheduling period of semi-persistent scheduling;
suspending, by the first terminal, transmission of the uplink data of the first service type before the starting position; and
continuing, by the first terminal, the transmission of the uplink data of the first service type according to the scheduling period after the starting position, wherein the scheduling indication is sent by the access network device after detecting that a second terminal transmits uplink data of a second service type on the first uplink resource, and a priority of the second service type is higher than a priority of the first service type, wherein the scheduling period comprises n scheduling periods of different durations, n being an integer greater than 1; and wherein continuing, by the first terminal, the transmission of the uplink data of the first service type according to the scheduling period after the starting position comprises:

determining, by the first terminal, a second uplink resource according to the starting position and a target scheduling period, wherein the target scheduling period is one of the n scheduling periods; and continuing, by the first terminal, the transmission of the uplink data of the first service type on the second uplink resource.

2. The method of claim 1, wherein the starting position is a sub-frame in which the scheduling indication is located; or the starting position is a sub-frame in which the first uplink resource is located.

3. The method of claim 1, wherein the target scheduling period is a minimum scheduling period among the n scheduling periods in an initial state.

4. The method of claim 3, further comprising: after continuing, by the first terminal, the transmission of the uplink data of the first service type on the second uplink resource, determining, by the first terminal, a third uplink resource for next transmission according to the target scheduling period and the second uplink resource when receiving an acknowledgement feedback from the access network device; and continuing, by the first terminal, the transmission of the uplink data of the first service type on the third uplink resource.

5. The method of claim 3, further comprising: after continuing, by the first terminal, the transmission of the uplink data of the first service type on the second uplink resource, when the first terminal does not receive an acknowledgement feedback from the access network device, adjusting, by the first terminal, the target scheduling period from an $i^{th}$ scheduling period to an $(i+1)^{th}$ scheduling period among the n scheduling periods, and determining, by the first terminal, a third uplink resource for next transmission according to the adjusted target scheduling period and the second uplink resource, wherein $0 \leq i \leq n-1$.

6. The method of claim 5, further comprising:

stopping, by the first terminal, the transmission of the uplink data of the first service type when the first terminal does not receive the acknowledgement feedback from the access network device and a number of times for which the target scheduling period is adjusted reaches a threshold; or stopping, by the first terminal, the transmission of the uplink data of the first service type when the first terminal does not receive the acknowledgement feedback from the access network device and the target scheduling period is a maximum scheduling period among the n scheduling periods.

7. The method of claim 1, wherein the target scheduling period is a maximum scheduling period among the n scheduling periods in an initial state.

8. The method of claim 7, further comprising: after continuing, by the first terminal, the transmission of the uplink data of the first service type on the second uplink resource, when the first terminal receives an acknowledgement feedback from the access network device and the target scheduling period is not a minimum scheduling period among the n scheduling periods, adjusting, by the first terminal, the target scheduling period from an $i^{th}$ scheduling period to an $(i-1)^{th}$ scheduling period among the n scheduling periods, and determining a third uplink resource for next transmission according to the target scheduling period and the second uplink resource, wherein $0 \leq i \leq n-1$; and continuing, by the first terminal, the transmission of the uplink data of the first service type on the third uplink resource.

9. The method of claim 8, further comprising: after determining the third uplink resource for the next transmission according to the $(i-1)^{th}$ scheduling period and the second uplink resource, when the first terminal does not receive the acknowledgement feedback from the access network device, recovering, by the first terminal, the target scheduling period from the $(i-1)^{th}$ scheduling period to the $i^{th}$ scheduling period among the n scheduling periods, and determining, by the first terminal, a fourth uplink resource for next transmission according to the target scheduling period and the third uplink resource; and continuing, by the first terminal, the transmission of the uplink data of the first service type on the fourth uplink resource.

10. The method of claim 7, further comprising: after continuing, by the first terminal, the transmission of the uplink data of the first service type on the second uplink resource, stopping, by the first terminal, the transmission of the uplink data of the first service type when the first terminal does not receive an acknowledgement feedback from the access network device.

11. The method of claim 1, further comprising:

receiving, by the first terminal, a resource release indication from the access network device; and stopping, by the first terminal according to the resource release indication, the transmission of the uplink data of the first service type on an uplink resource scheduled through the semi-persistent scheduling.

12. A method for uplink data transmission, comprising:

receiving, by an access network device, uplink data on a first uplink resource; and transmitting, by the access network device, a scheduling indication to a first terminal when detecting that uplink data of a first service type sent by a first terminal and uplink data of a second service type sent by a second terminal simultaneously exist on the first uplink resource, wherein the scheduling indication comprises a starting position and a scheduling period of semi-persistent scheduling, wherein a priority of the second service type is higher than a priority of the first service type, wherein the scheduling period comprises n scheduling periods of different durations, n being an integer greater than 1; and the scheduling indication indicates the first terminal to suspend transmission of the uplink data of the first service type before the starting position, determine a second uplink resource according to the starting position and a target scheduling period, the target scheduling period being one of the n scheduling periods, and continue the transmission of the uplink data of the first service type on the second uplink resource.

13. The method of claim 12, further comprising:
transmitting, by the access network device, a resource release indication to the first terminal when detecting that transmission of the uplink data of the second service type by the second terminal has completed, wherein the resource release indication is used for instructing the first terminal to stop transmission of the uplink data of the first service type on an uplink resource scheduled through the semi-persistent scheduling.

14. A terminal, comprising:
a transmitter, configured to transmit uplink data of a first service type on a first uplink resource;
a receiver, configured to receive a scheduling indication from an access network device, wherein the scheduling indication comprises a starting position and a scheduling period of semi-persistent scheduling; and
a processor, configured to suspend transmission of the uplink data of the first service type before the starting position;
wherein the transmitter is further configured to continue the transmission of the uplink data of the first service type according to the scheduling period after the starting position, and
wherein the scheduling indication is sent by the access network device after detecting that a second terminal transmits uplink data of a second service type on the first uplink resource, and a priority of the second service type is higher than a priority of the first service type,
wherein the scheduling period comprises n scheduling periods of different durations, n being an integer greater than 1; and
wherein the processor is further configured to determine a second uplink resource according to the starting position and a target scheduling period, the target scheduling period being one of the n scheduling periods; and
the transmitter is further configured to continue the transmission of the uplink data of the first service type on the second uplink resource.

15. The terminal of claim 14, wherein the target scheduling period is a minimum scheduling period among the n scheduling periods in an initial state.

16. The terminal of claim 15, wherein
the processor is further configured to determine a third uplink resource for next transmission according to the target scheduling period and the second uplink resource when receiving an acknowledgement feedback from the access network device; and
the transmitter is configured to continue the transmission of the uplink data of the first service type on the third uplink resource.

17. The terminal of claim 15, wherein the processor is further configured to:
when no acknowledgement feedback is received from the access network device, adjust the target scheduling period from an $i^{th}$ scheduling period to an $(i+1)^{th}$ scheduling period among the n scheduling periods, and determine a third uplink resource for next transmission according to the adjusted target scheduling period and the second uplink resource, wherein $0 \leq i \leq n-1$.

18. An access network device, comprising:
a receiver, configured to receive uplink data on a first uplink resource; and
a transmitter, configured to transmit a scheduling indication to a first terminal when detecting that uplink data of a first service type sent by a first terminal and uplink data of a second service type sent by a second terminal simultaneously exist on the first uplink resource, wherein the scheduling indication comprises a starting position and a scheduling period of semi-persistent scheduling,
wherein a priority of the second service type is higher than a priority of the first service type,
wherein the scheduling period comprises n scheduling periods of different durations, n being an integer greater than 1; and the scheduling indication indicates the first terminal to suspend transmission of the uplink data of the first service type before the starting position, determine a second uplink resource according to the starting position and a target scheduling period, the target scheduling period being one of the n scheduling periods, and continue the transmission of the uplink data of the first service type on the second uplink resource.

* * * * *